: US 10,129,290 B2
(45) Date of Patent: Nov. 13, 2018

(12) United States Patent
Thomas et al.

(54) DYNAMIC ADAPTIVE DEFENSE FOR CYBER-SECURITY THREATS

(71) Applicant: FireEye, Inc., Milpitas, CA (US)

(72) Inventors: Bernard Thomas, Ashburn, VA (US); David Scott, Marietta, GA (US); Fred Brott, Alexandria, VA (US); Paul Smith, Marietta, GA (US)

(73) Assignees: FireEye, Inc.; Milpitas, Inc.

( * ) Notice: Subject to any disclaimer, the term of this patent is extended or adjusted under 35 U.S.C. 154(b) by 21 days.

(21) Appl. No.: 15/089,170

(22) Filed: Apr. 1, 2016

(65) Prior Publication Data

US 2017/0063920 A1  Mar. 2, 2017

Related U.S. Application Data

(63) Continuation of application No. PCT/US2014/058909, filed on Oct. 2, 2014.

(60) Provisional application No. 61/886,056, filed on Oct. 3, 2013, provisional application No. 61/936,770, filed on Feb. 6, 2014, provisional application No. 61/943,912, filed on Feb. 24, 2014, provisional application No. 61/944,011, filed on Feb. 24, 2014, provisional application No. 61/944,019, filed on Feb. 24, 2014, provisional application No. 61/943,977, (Continued)

(51) Int. Cl.
*H04L 9/00* (2006.01)
*H04L 29/06* (2006.01)
*H04L 9/32* (2006.01)

(52) U.S. Cl.
CPC .......... *H04L 63/1441* (2013.01); *H04L 9/002* (2013.01); *H04L 9/32* (2013.01); *H04L 63/0272* (2013.01); *H04L 63/1408* (2013.01); *H04L 63/1416* (2013.01)

(58) Field of Classification Search
CPC .................................................. H04L 63/1458
See application file for complete search history.

(56) References Cited

U.S. PATENT DOCUMENTS 5,966,441 A * 10/1999 Calamera ............ H04L 63/0428
  713/167
8,176,554 B1 * 5/2012 Kennedy ............... H04L 63/145
  726/23

(Continued)

FOREIGN PATENT DOCUMENTS

WO  WO 2009047113 A1  4/2009

OTHER PUBLICATIONS

International Search Report and Written Opinion for International Application No. PCT/US2014/058909, dated Mar. 2, 2015.

(Continued)

*Primary Examiner* — Josnel Jeudy

(57) ABSTRACT

Disclosed is a cyber-security system that is configured to aggregate and unify data from multiple components and platforms on a network. The system allows security administrators can to design and implement a workflow of device-actions taken by security individuals in response to a security incident. Based on the nature of a particular threat, the cyber-security system may initiate an action plan that is tailored to the security operations center and their operating procedures to protect potentially impacted components and network resources.

21 Claims, 21 Drawing Sheets

Related U.S. Application Data filed on Feb. 24, 2014, provisional application No. 61/943,990, filed on Feb. 24, 2014.

(56) References Cited

U.S. PATENT DOCUMENTS

| | | | |
|---|---|---|---|
| 8,245,302 B2 * | 8/2012 | Evans | G06F 21/577 726/22 |
| 8,631,330 B1 * | 1/2014 | Hwang | G06F 3/0484 715/707 |
| 8,688,790 B2 * | 4/2014 | LeVasseur | H04L 51/12 709/203 |
| 9,276,946 B2 * | 3/2016 | Coates | H04L 63/1416 |
| 9,787,714 B2 * | 10/2017 | Bach | H04L 63/1483 |
| 2002/0171546 A1 * | 11/2002 | Evans | G06F 21/554 340/540 |
| 2005/0138425 A1 * | 6/2005 | Kim | H04L 63/1408 726/4 |
| 2006/0212932 A1 | 9/2006 | Patrick et al. | |
| 2007/0186284 A1 | 8/2007 | McConnell | |
| 2007/0255723 A1 | 11/2007 | Jung et al. | |
| 2008/0016569 A1 * | 1/2008 | Hammer | G06F 21/554 726/23 |
| 2010/0043066 A1 | 2/2010 | Miliefsky | |
| 2010/0050260 A1 | 2/2010 | Nakakoji et al. | |
| 2010/0100964 A1 * | 4/2010 | Mahaffey | G06F 21/554 726/25 |
| 2011/0154509 A1 * | 6/2011 | Mostinski | G06F 21/554 726/34 |
| 2011/0202995 A1 * | 8/2011 | Markham | G06F 21/554 726/22 |
| 2011/0264608 A1 | 10/2011 | Gonsalves et al. | |
| 2011/0302291 A1 | 12/2011 | Draugelis | |
| 2016/0065603 A1 * | 3/2016 | Dekel | H04L 63/1425 726/23 |
| 2016/0078236 A1 * | 3/2016 | Chesla | H04L 41/22 726/1 |

OTHER PUBLICATIONS

Extended European Search Report for European Patent Application No. 14850557.1 dated Apr. 28, 2017.

* cited by examiner

DYNAMIC ADAPTIVE DEFENSE FOR CYBER-SECURITY THREATS

CROSS-REFERENCE TO RELATED APPLICATIONS

This application is a continuation of International Application No. PCT/US2014/058909, filed Oct. 2, 2014. International Application No. PCT/US2014/058909 claims priority to and the benefit of U.S. Provisional Application No. 61/886,056, filed Oct. 3, 2013; U.S. Provisional Application No. 61/936,770, filed Feb. 6, 2014; U.S. Provisional Application No. 61/943,912, filed Feb. 24, 2014; U.S. Provisional Application No. 61/944,011, filed Feb. 24, 2014; U.S. Provisional Application No. 61/944,019, filed Feb. 24, 2014; U.S. Provisional Application No. 61/943,977, filed Feb. 24, 2014; and U.S. Provisional Application No. 61/943,990, filed Feb. 24, 2014. The disclosures of the foregoing applications are incorporated herein by reference in their entireties.

TECHNICAL FIELD

The technology described herein relates to systems and methods for defending network systems and components against cyber security threats.

BACKGROUND

Currently, no capability exists to leverage increasingly important threat detection and intrusion prevention systems to automate and orchestrate the remediation of distributed denial of service (DDoS) and other "cyberspace" threats across a heterogeneous collection of security or other network components or computer systems, through a single, integrated, workflow-based action controller. The information included in this Background section of the specification, including any references cited herein and any description or discussion thereof, is included for technical reference purposes only and is not to be regarded subject matter by which the scope of the invention as defined in the claims is to be bound.

SUMMARY

A distributed denial of service (DDoS) detection and reaction solution disclosed herein provides a tool to provide visibility into network behavior, alert analysts to anomalous events and provide mitigation options to attacks. The solution provides a dynamic adaptive defense (DAD) capable of receiving an indication of cyber threat and executing defined actions in an automated manner (with or without human intervention) to address that threat. Examples of such response actions include (but are not limited to): ingest security event information from multiple sources and formats and normalize to a single security event schema that can be acted upon at an abstract level; pull network information to further enrich and understand a security the event; retrieve threat indicators and signatures from detection solutions to further educate the analyst about the nature of the threat; retrieve analytic results from various network assets; open and manage trouble tickets; interact with policy management and control systems to enforce policy definitions; re-image network and endpoint equipment; enforce policy updates to perimeter defense assets to block threat actors from causing further damage.

One or more cyber data management nodes (CDMN) may be positioned "downstream" of either passive or active network probe devices to provide for "near real time" standard ingest functions (such as normalization) as well as robust in-flow enrichment and business logic processing integrated with a network activation module, collaborative data-type resolution functions, and reporting and activity monitoring. CDMN is not a probe per se. It sits in-line between the probe and the repository. It augments the functionality of any probe—passive or active, legacy or modern—by providing correlation and data enrichment services to the data stream directed to an analytic repository. "Near real time" network command functions can be activated automatically, for example, from data-type thresholds or data-type enrichment matches, or from other workflow plans configurable in the CDMN. Standard database analytic tools may be supported through better data collection activities which include tagging, correlation, data assembly and other advanced ingest functionality. The CDMN can be scaled to support an individual network probe, IAP or collector, and is also capable of supporting extremely large network activity volumes in a network of more centralized sites.

A method of defending a network against a cyber-security threat is disclosed. The method including receiving a cyber-security alert at a cyber-data management node, the cyber-data management node operating on a server associated with a network; analyzing the received cyber-security alert by a mediation component of the cyber-data management node to determine a security threat to the network; and responding to the security threat by initiating at least one automated action via an operation of an activation component of the cyber-data management node, the at least one automated action including a reconfiguration of a network element.

A system for defending a network against a cyber-security threat is disclosed. The system including at least one processor; at least one memory operably linked to the at least one processor, wherein the at least one memory comprises instructions, which when executed on the at least one processor, cause the processor to receive a cyber-security alert; analyze the cyber-security alert to determine a security threat to a network; and respond to the security threat by initiating at least one automated action, the at least one automated action including a reconfiguration of a network element; map the security threat to one or more preplanned responses based on the security threat, the one or more preplanned responses including actions approved by network security personal for responding to the security threat, but not approved to be automatically initiated; and further respond to the security threat by initiating at least one mapped preplanned response, the mapped preplanned response corresponding to a selection made by network security personal.

A system for defending a network against a cyber-security threat is disclosed. The system including a server operating on a computer network, the server having at least one processor and a memory operably linked to the processor; and a cyber-data management node including computer-readable instructions stored in the memory and configured to execute on the processor, the computer-readable instructions being organized into one or more modules including a mediation module, an activation module, a reporting module; wherein the mediation module is configured to: receive a cyber-security alert; analyze the cyber-security alert to determine a security threat to a network; and map the security threat to one or more preplanned responses based on the security threat, the one or more preplanned responses including actions approved by network security personal for responding to the security threat, but not approved to be automatically initiated; the activation module is configured to: respond to the security threat by initiating at least one automated action, the at least one automated action including a reconfiguration of a network element; and further respond to the security threat by initiating at least one mapped preplanned response, the mapped preplanned response corresponding to a selection made by network security personal; and the reporting module is configured to: provide a security threat response report including data regarding the at least one automated action, the mapping between the security threat and the one or more preplanned responses, and the selection of a mapped preplanned response by network security personal.

A method of identifying and analyzing a cyber-security attack is disclosed. The method including receiving a cyber-security alert for a cyber-security attack at a cyber-data management node, the cyber-data management node operating on a server associated with a network; analyzing the received cyber-security alert by a mediation component of the cyber-data management node to determine a first data set of information regarding the cyber-security attack; analyzing at least a portion of the first data set by the mediation component to determine a second data set of information regarding the cyber-security attack; and outputting an expanded data set for the cyber-security attack by a reporting component of the cyber-data management node, the expanded data set including at least a portion of the first data set and at least a portion of the second data set of information regarding the cyber-security attack.

A system for identifying and analyzing a cyber-security attack is disclosed. The system including at least one processor; at least one memory operably linked to the at least one processor, wherein the at least one memory comprises instructions, which when executed on the at least one processor, cause the processor to receive a cyber-security alert for a cyber-security attack; compile information regarding the received cyber-security; analyze the complied information and continue to compile information regarding the received cyber-security until a threshold amount of information regarding the cyber-security attack is obtained; and output an expanded data set for the cyber-security attack including at least a portion of the complied information.

A system for identifying and analyzing a cyber-security attack is disclosed. The system including a server operating on a computer network, the server having at least one processor and a memory operably linked to the processor; and a cyber-data management node including computer-readable instructions stored in the memory and configured to execute on the processor, the computer-readable instructions being organized into one or more modules including a mediation module and a reporting module; wherein the mediation module is configured to receive a cyber-security alert for a cyber-security attack, compile information regarding the received cyber-security, and analyze the complied information and continue to compile information regarding the received cyber-security until a threshold amount of information regarding the cyber-security attack is obtained; and the reporting module is configured to output an expanded data set for the cyber-security attack including at least a portion of the complied information.

A method of responding to a cyber-security attack is disclosed. The method including receiving a cyber-security alert for a cyber-security attack at a cyber-data management node, the cyber-data management node operating on a server associated with a network; analyzing the received cyber-security alert by a mediation component of the cyber-data management node to determine a cyber-security response including at least one countermeasure to be applied to a network security element; and displaying a plurality of icons by a reporting component of the cyber-data management node including a countermeasure icon for the at least one countermeasure and a network security element icon for the network security element, the countermeasure icon and the network security node being grouped together in a graphical user interface; wherein at least one of the countermeasure icon or the network security element icon is selectable by a user to cause the at least one countermeasure to be applied to the network security element.

A system for responding to a cyber-security attack is disclosed. The system including at least one processor; at least one memory operably linked to the at least one processor, wherein the at least one memory comprises instructions, which when executed on the at least one processor, cause the processor to display a plurality of network security element icons in a network security map; display a plurality of cyber-security countermeasure icons in the network security map; receive user input that correlates at least one of the network security elements icons with at least one of the cyber-security countermeasure icons; and apply a cyber-security countermeasure to a network security element responsive to the user input, wherein the cyber-security countermeasure corresponds to the at least one cyber-security countermeasure icon and the network security element corresponds to the at least one network security element icon.

A system for identifying and analyzing a cyber-security attack is disclosed. The system including a server operating on a computer network, the server having at least one processor and a memory operably linked to the processor; and a cyber-data management node including computer-readable instructions stored in the memory and configured to execute on the processor, the computer-readable instructions being organized into one or more modules including a mediation module, a reporting module, and an activation module; wherein the mediation module is configured to receive a cyber-security alert for a cyber-security attack, and analyze the cyber-security alert to at least identify a source of the cyber-security attack; the reporting module is configured to display an indication of the source of the cyber-security attack on a network security map, display a plurality of network security elements icons in the network security map, display a plurality of cyber-security countermeasure icons in the network security map, and receive user input that correlates at least one of the network security element icons with at least one of the cyber-security countermeasure icons; and the activation module is configured to apply a cyber-security countermeasure to a network security element responsive to the user input, wherein the cyber-security countermeasure corresponds to the at least one cyber-security countermeasure icon and the network security element corresponds to the at least one network security element icon.

A method of responding to a cyber-security attack is disclosed. The method including receiving a cyber-security alert for a cyber-security attack at a cyber-data management node, the cyber-data management node operating on a server associated with a network; responding to the cyber-security attack by automatically executing at least one network security action by an activation component of the cyber-data management node, including applying the at least one network security action to a particular network element according to an established network security policy; and displaying one or more network security actions in a graphical user interface by a reporting component of the cyber-data management node; wherein at least one of the network security actions in the graphical user interface is selectable by a user to cause the activation component to further respond to the cyber-attack by executing the selected network security action.

A system for responding to a cyber-security attack is disclosed. The method including at least one processor; at least one memory operably linked to the at least one processor, wherein the at least one memory comprises instructions, which when executed on the at least one processor, cause the processor to receive a cyber-security alert for a cyber-security attack; execute automatically at least one network security action responsive to the cyber-security attack including applying the at least one network security action to a particular network element according to an established network security policy; display one or more preplanned network security actions in a graphical user interface, each preplanned network security action being correlated with at least one particular network security element according to the established network security policy; display one or more custom network security actions in the graphical user interface, each custom network security action not being specifically correlated with a particular network security element in established network security policy; receive a user input that selects at least one of a preplanned network security action or a custom network security action through the graphical user interface; and further respond to the cyber-security attack by executing the network security action selected by the user.

A system for identifying and analyzing a cyber-security attack is disclosed. The system including a server operating on a computer network, the server having at least one processor and a memory operably linked to the processor; and a cyber-data management node including computer-readable instructions stored in the memory and configured to execute on the processor, the computer-readable instructions being organized into one or more modules including a mediation module, a reporting module, and an activation module; wherein the mediation module is configured to receive a cyber-security alert for a cyber-security attack; the reporting module is configured to: display one or more preplanned network security actions in a graphical user interface, each preplanned network security action being correlated with at least one particular network security element according to an established network security policy; display one or more custom network security actions in the graphical user interface, each custom network security action not being specifically correlated with a particular network security element in established network security policy; receive a user input that selects at least one of a preplanned network security action or a custom network security action through the graphical user interface; and the activation module is configured to: execute automatically at least one network security action responsive to the cyber-security attack including applying the at least one network security action to a particular network element according to the established network security policy; and further respond to the cyber-security attack by executing the network security action selected by the user.

A method of responding to a cyber-security attack is disclosed. The method including receiving a cyber-security alert for a cyber-security attack at a cyber-data management node, the cyber-data management node operating on a server associated with a network; displaying one or more network security actions in a graphical user interface by a reporting component of the cyber-data management node; responding to the cyber-security attack by an activation component of the cyber-data management node including executing one or more network security actions selected by a user through the graphical user interface; repeating the operations of displaying and responding until the cyber-attack is mitigated; and storing one or more network security actions that contributed to mitigating the cyber-attack as part of a network security policy so as to be automatically applied without specific user input in response to a subsequent cyber-attack.

A system for responding to a cyber-security attack is disclosed. The system including at least one processor at least one memory operably linked to the at least one processor, wherein the at least one memory comprises instructions, which when executed on the at least one processor, cause the processor to receive a cyber-security alert for a cyber-security attack; display one or more network security actions in a graphical user interface; respond to the cyber-security attack including executing one or more network security actions selected by a user through the graphical user interface; repeat the operations of displaying and responding until the cyber-attack is mitigated; and store one or more network security actions that contributed to mitigating the cyber-attack as part of a network security policy so as to be automatically applied without specific user input in response to a subsequent cyber-attack.

A system for identifying and analyzing a cyber-security attack is disclosed. The system including a server operating on a computer network, the server having at least one processor and a memory operably linked to the processor; and a cyber-data management node including computer-readable instructions stored in the memory and configured to execute on the processor, the computer-readable instructions being organized into one or more modules including a mediation module, a reporting module, and an activation module; wherein the mediation module is configured to receive a cyber-security alert for a cyber-security attack; the reporting module is configured to display one or more network security actions in a graphical user interface; and the activation module is configured to respond to the cyber-security attack including executing one or more network security actions selected by a user through the graphical user interface; and the cyber-data management node is configured to repeat the operations of displaying and responding until the cyber-attack is mitigated, and to store one or more network security actions that contributed to mitigating the cyber-attack as part of a network security policy so as to be automatically applied without specific user input in response to a subsequent cyber-attack.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

DETAILED DESCRIPTION

Present embodiments are directed to a cyber-security system that is configured to aggregate and unify data from multiple components and platforms on a network. Security administrators can utilize the solution to design and implement a workflow of device-actions taken by security individuals in response to a security incident. Based on the nature of a particular threat, the cyber-security system may initiate an action plan that is tailored to the security operations center (SOC) and their operating procedures to protect potentially impacted components and network resources. Disclosed cyber-security system embodiments provide rapid and reliable, enterprise-wide automation and orchestration of threat responses and can prioritize between multiple possible responses based upon the type of threat and components on a network. Disclosed embodiments also provide enhanced capability to operate effectively, mitigate threats, survive breaches, and maintain operations during attacks. Upon recognition of a cyber-security threat, through pre-configured activation workflow plans, the cyber-security system automatically provides system configuration instructions to defend against threats originating both external to and internal to the network. As compared to prior art systems, disclosed cyber-security system embodiments provide for improved command and control capability; allow the establishment of extended perimeter defensive capabilities; permit the establishment capability for pre-emptive defense; reduce the time, effort and cost of responding to incident; and reduce the impact of threats to the network environment.

Cyber Data Management Node

Figure 1:
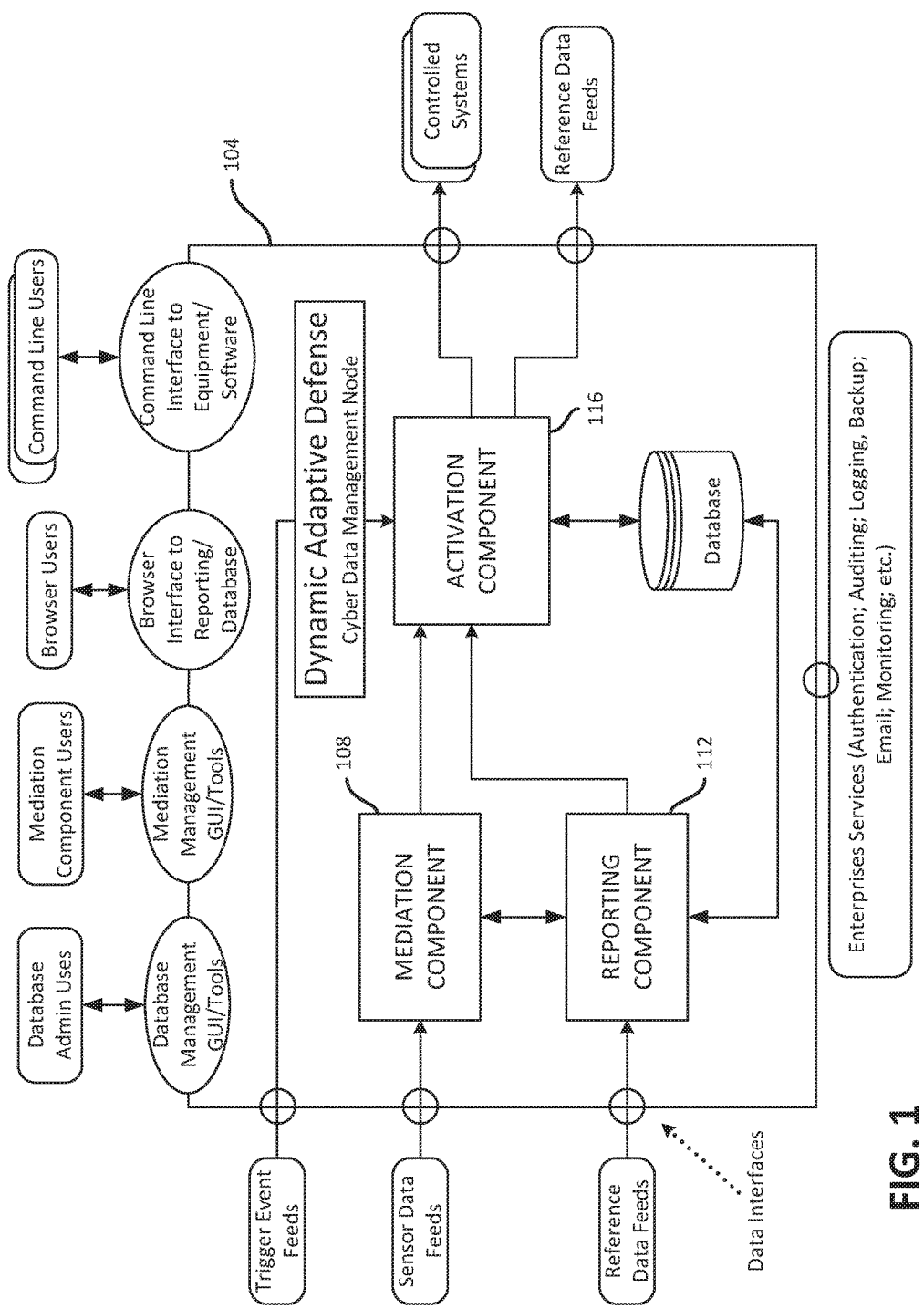
FIG. 1 is schematic illustration of a cyber-data management node in accordance with embodiments discussed herein.

FIG. 1 is schematic illustration of a cyber-data management node 104, which is generally referred to with reference numeral 104. The cyber-data management node 104 may be a component of a cyber-security system in accordance with embodiments discussed herein. The cyber-data management node 104 node is generally configured to ingest internet protocol (IP) and other data for analysis to determine acceptance/denial in the network as well as dealing with disparate data and transforming it into an understandable and meaningful database for logical analysis. The cyber-data management node 104 includes a mediation component 108 that is configured to ingest, enrich, and analyze data regarding cyber-security alerts and threats. The cyber-data management node 104 additionally includes a reporting component 112 that is in communication with the mediation component 108. The reporting component 112 is configured to receive ingested data from the mediation component 108 and to make the ingested data available for interrogation. The cyber-data management node 104 also includes an activation component 116 that is in communication with the mediation component 108 and the reporting component 112. The activation component 116 is configured to respond to manual triggers and/or triggers received from the mediation component 108 by controlling and/or managing disparate network elements to mitigate cyber-security threats.

Figure 2:
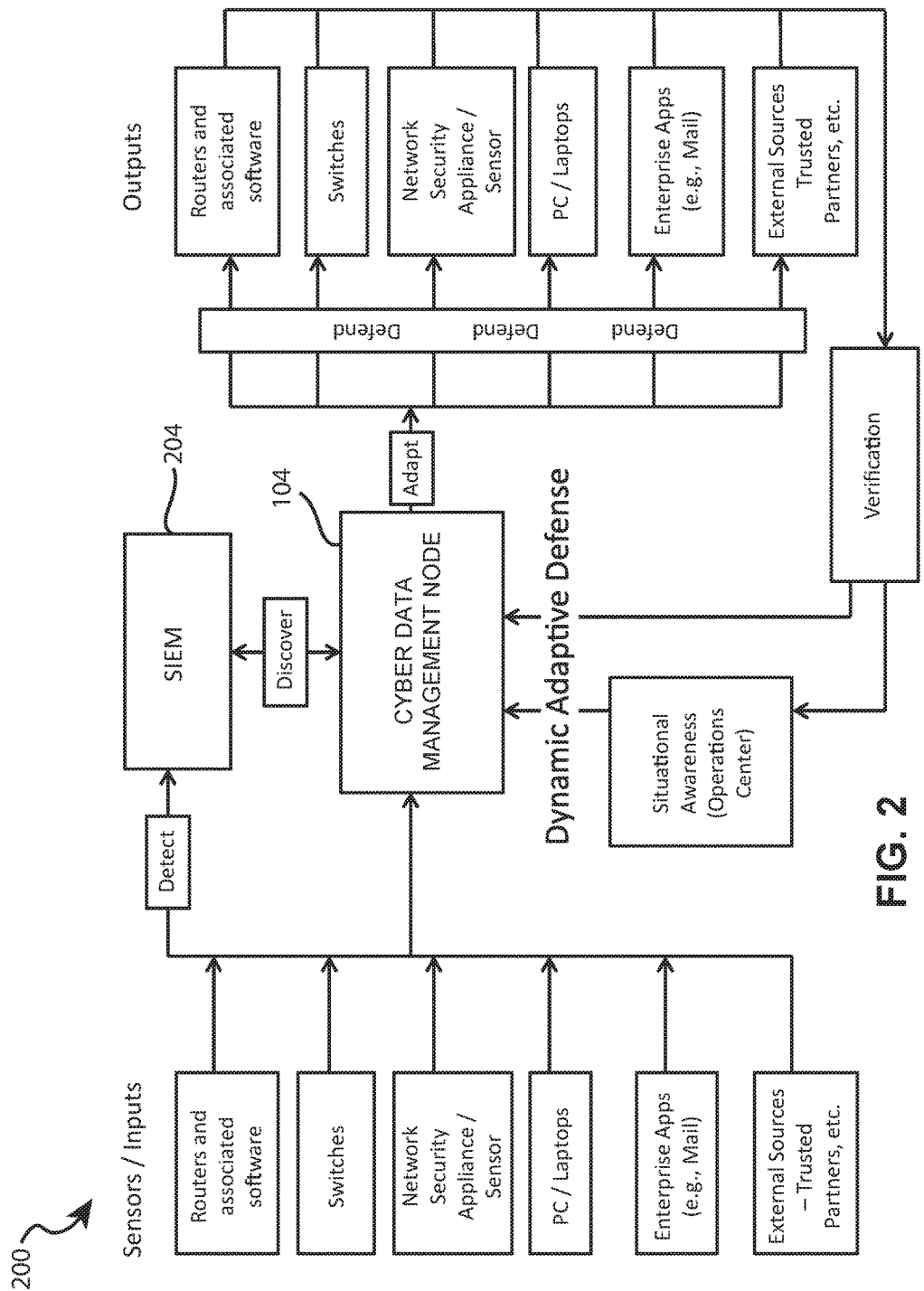
FIG. 2 is a schematic illustration of an example network implementation that includes the cyber-data management node of FIG. 1.

FIG. 2 is a schematic illustration of an example network 200 implementation that includes a cyber-data management node 104 in accordance with embodiments discussed herein. As can be seen in FIG. 2, the cyber-data management node 104 may be deployed in conjunction with a security incident and event manager ("SIEM") package 204. In this configuration, the cyber-data management node 104 can deploy action-led, multi-threaded responses at machine speed. In some instances, the cyber-data management node 104 can augment an existing SIEM solution. Known SIEM solutions typically provide real-time application and network monitoring for threats based upon analytics, behavior profiling, and network intelligence; but fail to provide any determinative analytics or system controls to actually respond to identified threats. Known SIEM solutions leave these decisions and actions to manual, human decision and control. By automating or partially automating determinative analytics and/or system controls, a cyber-data management node 104 can enhance or augment SIEM solutions in network 200 implementations such as the one shown in FIG. 2.

Figure 3:
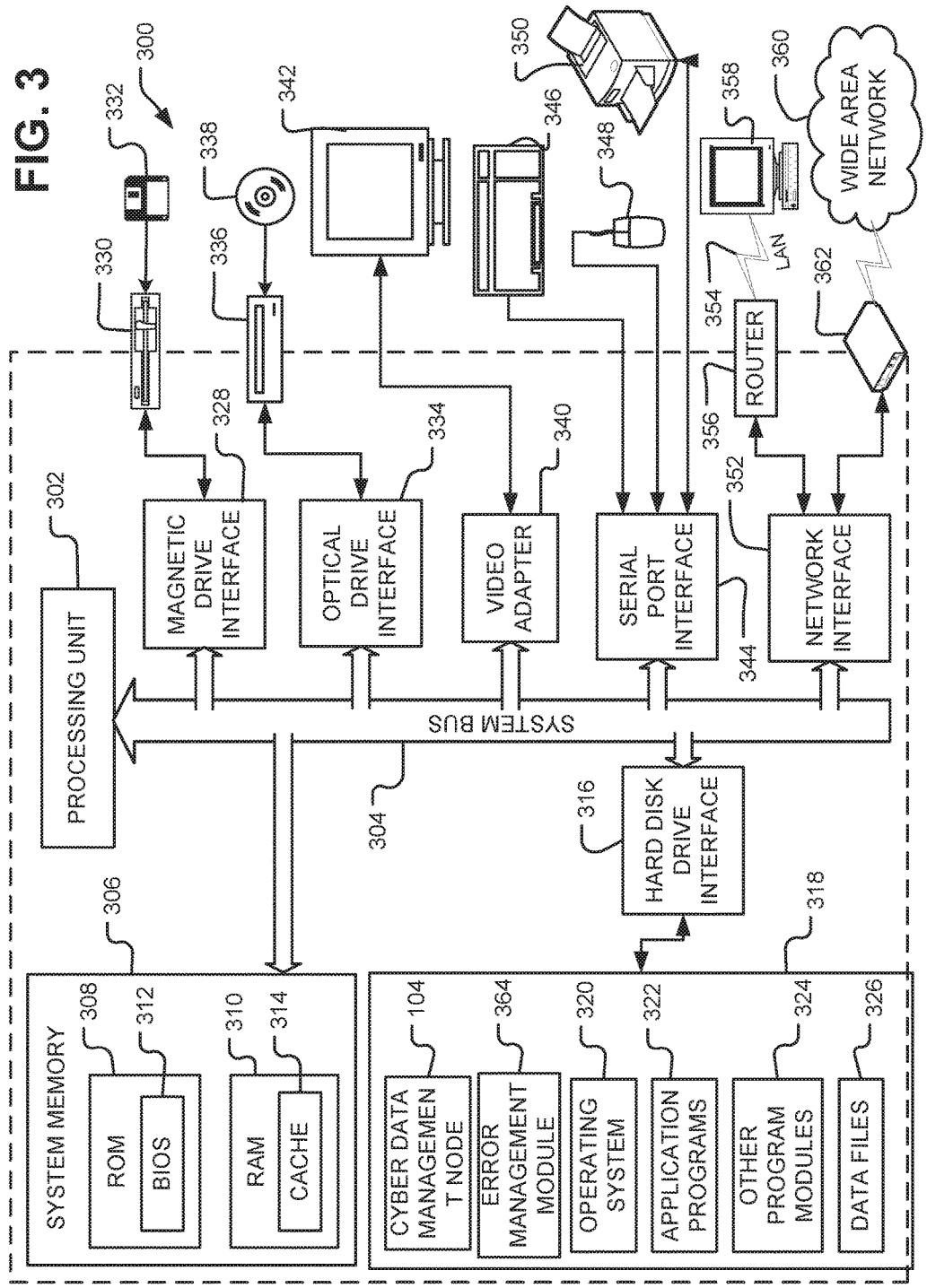
FIG. 3 is a schematic illustration of an exemplary computer system for implementing the cyber-data management node of FIG. 1.

In various embodiments, the cyber-data management node 104 or components associated with the cyber-data management node 104 can be implemented in various computing environments. An exemplary computer system 300 for implementing the cyber-data management node 104 is depicted in FIG. 3. The computer system 300 used to implement the cyber-data management node 104 may be a such as a single-server, clustered server, blade server, or virtual server operating environment, or possibly a personal computer (PC), a mainframe computer, a distributed computer, an Internet appliance, or other computer devices, or combinations thereof, with internal processing and memory components as well as interface components for connection with external input, output, storage, network, and other types of peripheral devices. Internal components of the computer system in FIG. 3 are shown within the dashed line and external components are shown outside of the dashed line. Components that may be internal or external are shown straddling the dashed line.

In any embodiment or component of the system described herein, the computer system 300 includes a processor 302 and a system memory 306 connected by a system bus 304 that also operatively couples various system components. There may be one or more processors 302, e.g., a single central processing unit (CPU), or a plurality of processing units, commonly referred to as a parallel processing environment (for example, a dual-core, quad-core, or other multi-core processing device). The system bus 304 may be any of several types of bus structures including a memory bus or memory controller, a peripheral bus, a switched fabric, point to point connection, and a local bus using any of a variety of bus architectures. The system memory 306 includes read only memory (ROM) 308 and random access memory (RAM) 310. A basic input/output system (BIOS) 312, containing the basic routines that help to transfer information between elements within the computer system 300, such as during start up, is stored in ROM 308. A cache 314 may be set aside in RAM 310 to provide a high speed memory store for frequently accessed data.

A hard disk drive interface 316 may be connected with the system bus 304 to provide read and write access to a data storage device, e.g., a hard disk drive 318, for nonvolatile storage of applications, files, and data. A number of program modules and other data may be stored on the hard disk 318, including an operating system 320, one or more application programs 322, and data files 324. In an exemplary implementation, the hard disk drive 318 may store code associated with the cyber-data management node 104 according to the exemplary processes described herein. In certain embodiments, the hard disk drive 318 may store code associated with an error management or system component 364, which is discussed in greater detail below. Note that the hard disk drive 318 may be either an internal component or an external component of the computer system 300 as indicated by the hard disk drive 318 straddling the dashed line in FIG. 3. In some configurations, there may be both an internal and an external hard disk drive 318.

The computer system 300 may further include a magnetic disk drive 330 for reading from or writing to a removable magnetic disk 332, tape, or other magnetic media. The magnetic disk drive 330 may be connected with the system bus 304 via a magnetic drive interface 328 to provide read and write access to the magnetic disk drive 330 initiated by other components or applications within the computer system 300. The magnetic disk drive 330 and the associated computer readable media may be used to provide nonvolatile storage of computer readable instructions, data structures, program modules, and other data for the computer system 300.

The computer system 300 may additionally include an optical disk drive 336 for reading from or writing to a removable optical disk 338 such as a CD ROM or other optical media. The optical disk drive 336 may be connected with the system bus 304 via an optical drive interface 334 to provide read and write access to the optical disk drive 336 initiated by other components or applications within the computer system 300. The optical disk drive 336 and the associated computer readable optical media may be used to provide nonvolatile storage of computer readable instructions, data structures, program modules, and other data for the computer system 300.

A display device 342, e.g., a monitor, a television, or a projector, or other type of presentation device may also be connected to the system bus 304 via an interface, such as a video adapter 340 or video card. Similarly, audio devices, for example, external speakers or a microphone (not shown), may be connected to the system bus 304 through an audio card or other audio interface (not shown).

In addition to the monitor 342, the computer system 300 may include other peripheral input and output devices, which are often connected to the processor 302 and memory 306 through the serial port interface 344 that is coupled to the system bus 304. Input and output devices may also or alternately be connected with the system bus 304 by other interfaces, for example, a universal serial bus (USB), an IEEE 1394 interface ("Firewire"), a parallel port, or a game port. A user may enter commands and information into the computer system 300 through various input devices including, for example, a keyboard 346 and pointing device 348, for example, a mouse. Other input devices (not shown) may include, for example, a joystick, a game pad, a tablet, a touch screen device, a satellite dish, a scanner, a facsimile machine, a microphone, a digital camera, and a digital video camera.

Output devices may include a printer 350 and one or more loudspeakers (not shown) for presenting audio. Other output devices (not shown) may include, for example, a plotter, a photocopier, a photo printer, a facsimile machine, and a press. In some implementations, several of these input and output devices may be combined into single devices, for example, a printer/scanner/fax/photocopier. It should also be appreciated that other types of computer readable media and associated drives for storing data, for example, magnetic cassettes or flash memory drives, may be accessed by the computer system 300 via the serial port interface 344 (e.g., USB) or similar port interface.

The computer system 300 may operate in a networked environment using logical connections through a network interface 352 coupled with the system bus 304 to communicate with one or more remote devices. The logical connections depicted in FIG. 3 include a local area network (LAN) 354 and a wide area network (WAN) 360. Such networking environments are commonplace in home networks, office networks, enterprise wide computer networks, and intranets. These logical connections may be achieved by a communication device coupled to or integral with the computer system 300. As depicted in FIG. 3, the LAN 654 may use a router 356 or hub, wired or wireless, internal or external, to connect with remote devices, e.g., a remote computer 358, similarly connected on the LAN 354. The remote computer 358 may be another personal computer, a server, a client, a peer device, or other common network node, and typically includes many or all of the elements described above relative to the computer system 300.

To connect with a WAN 360, the computer system 300 typically includes a modem 362 for establishing communications over the WAN 360. Typically the WAN 360 may be the Internet. However, in some instances the WAN 360 may be a large private network spread among multiple locations, or a virtual private network (VPN). The modem 362 may be a telephone modem, a high speed modem (e.g., a digital subscriber line (DSL) modem), a cable modem, or similar type of communications device. The modem 362, which may be internal or external, is connected to the system bus 304 via the network interface 352. In alternate embodiments the modem 362 may be connected via the serial port interface 344. It should be appreciated that the network connections shown are exemplary and other means of and communications devices for establishing a network communications link between the computer system 300 and other devices or networks may be used.

Figure 4:
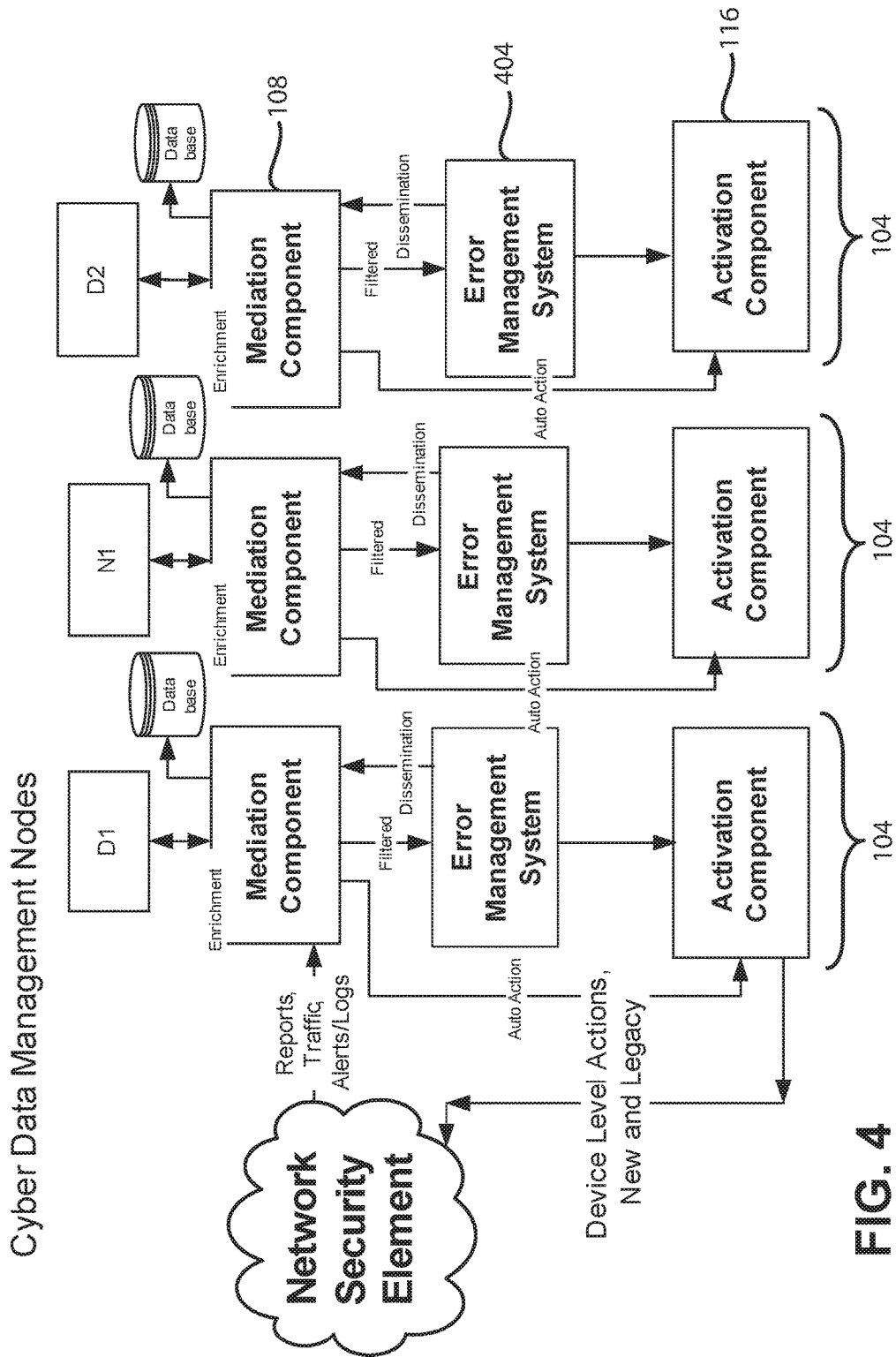
FIG. 4 is a schematic illustration of another configuration for the cyber-data management node of FIG. 1.

The cyber-data management node 104 can be deployed in various different configurations depending on the implementation. In one embodiment, the cyber-data management node 104 can be implemented as a single data management node. Here, a local network can interface into a single instance of the cyber security system which may have a shared database and shared operations. In other embodiments, the cyber-data management node 104 can be implemented as a central cyber command node. Here, local networks can operate with independent instances of the mediation component 108 and databases to store, analyze, and maintain cyber events. The error handling process will be a shared instance of the activation component 116. In still other embodiments, the cyber-data management node 104 can be implemented as an independent management node. This configuration, as shown in FIG. 4, allows various entities to operate independently and to perform individual operational commands for ingest, analysis, maintenance, error handling and alarming.

Mediation Component

As described above in connection with FIG. 1, a cyber-data management node 104 in accordance with embodiments discussed herein may include a mediation component 108 that is configured to ingest, enrich, and analyze data regarding cyber-security alerts and threats. The mediation component 108 can provide control over the ingest and enrichment processes of IP access, data and content, while at the same time providing a platform that enables the rapid introduction of new data sources and ingest rules.

In connection with ingesting data, the mediation component 108 may be configured to gather and process information towards the goal of creating a clean data set for human or automated analytic consumption. The mediation component 108 may ingest data by collection from any source, data validation, aggregation, correlation, error suppression and correction, and preparation for population of one or more relational databases. This can include SIEM solutions, IDS and IPS devices, third party threat intel feeds, and any other triggering mechanism for a security event.

In connection with enriching data, the mediation component 108 may be configured to blend referential data with ingested information to increase the value of the ingested data. Referential data can be names, addresses, co-ordinates, adjective text, or any other additive value. The mediation component 108 enriches and transforms data for example, to remove the private nature of raw data and to enhance its meaning. additionally, many attributes of the raw ingested data are slowly changing in nature (e.g., DHCP assignments, domain assignments) so as to render its meaning unclear. By resolving these attributes close to the time of ingest and before commitment to a repository, the mediation component 108 avoids extensive post-processing "joins" and permits early and rapid analysis using these attributes.

In connection with analyzing data, the mediation component 108 may be configured with an attribution functionality that matches data from various sources for the purpose of assigning the intent or identity to the action. The mediation component 108 achieves attribution by correlating multiple streams of data, for example, correlating phone records with network access records, to obtain the broad picture of usage of related resources, systems, networks, and so on, rather than just evaluating single streams or even snapshots of the information. Systems and methods disclosed herein use mediation technologies for cyber security to map events with actors, intent, locations and techniques. In various embodiments, the system maps many events to single actors, intents, and/or locations, or the reverse; one actor, intent, location profile to many events. However, disclosed systems and methods are limited to that functionality. The mediation component can also perform analysis by normalizing the inbound data so that data analysis can occur, allowing for routing to the proper remediation plans and techniques such as blocking the threat actor on various assets.

In various embodiments, meditation systems originally adapted for use in telecommunication systems ("telcom") are adapted and used in the cyber security context. Telcom mediation can be advantageous because it provides very high speed (8-12 fold that of contemporary data matching/search technologies) correlation between two or more sets of differing data, and the ability to reduce those data sets to their commonalities. Applying mediation technology to cyber security provides new security capabilities such as immediate, machine speed information discovery, correlation and presentation. For example, embodiments can use the automation and commonality detection powers of mediation to react to cyber-attacks by immediately matching threatening cyber behaviors and actors with information in globally disparate reputation, threat, and research systems feeds, to bring the entire world's knowledge about the threat to the security analyst's screen in a normalized, error-free, summarized and immediate way. This information may be reduced (de-duplicated), summarized (displayed as key indicators of good/bad status) and matched specifically to the threat at hand. Customized views and information categories the user has selected may also be displayed or otherwise presented. Disclosed embodiments may implement a "one to many approach" by taking a few, or even a single item, like an IP address and finding commonalities in the world's global threat repositories, subscriptions and services. Alternatively, disclosed embodiments may take a "many to one approach" by using mediation to identify key indicators in network flow data that recognizes a single attacker (profile) even when that attacker is rapidly hopping from one source IP address to another.

The mediation component 108 may include a rapid development environment to ease the task of building business logic. The mediation component 108 may include a set of tools that enable users to develop new ingest logic independently and to do so in a business oriented fashion. Using the efficient and intuitive tools, the user can, with minimal effort and resources, develop the new ingest logic scripts and then run them through an interactive testing facility before packaging-up for deployment. The mediation component 108 may be an integrated data handling system capable of operating in a single-server, clustered server, blade server or virtual server operating environment.

Figure 5:
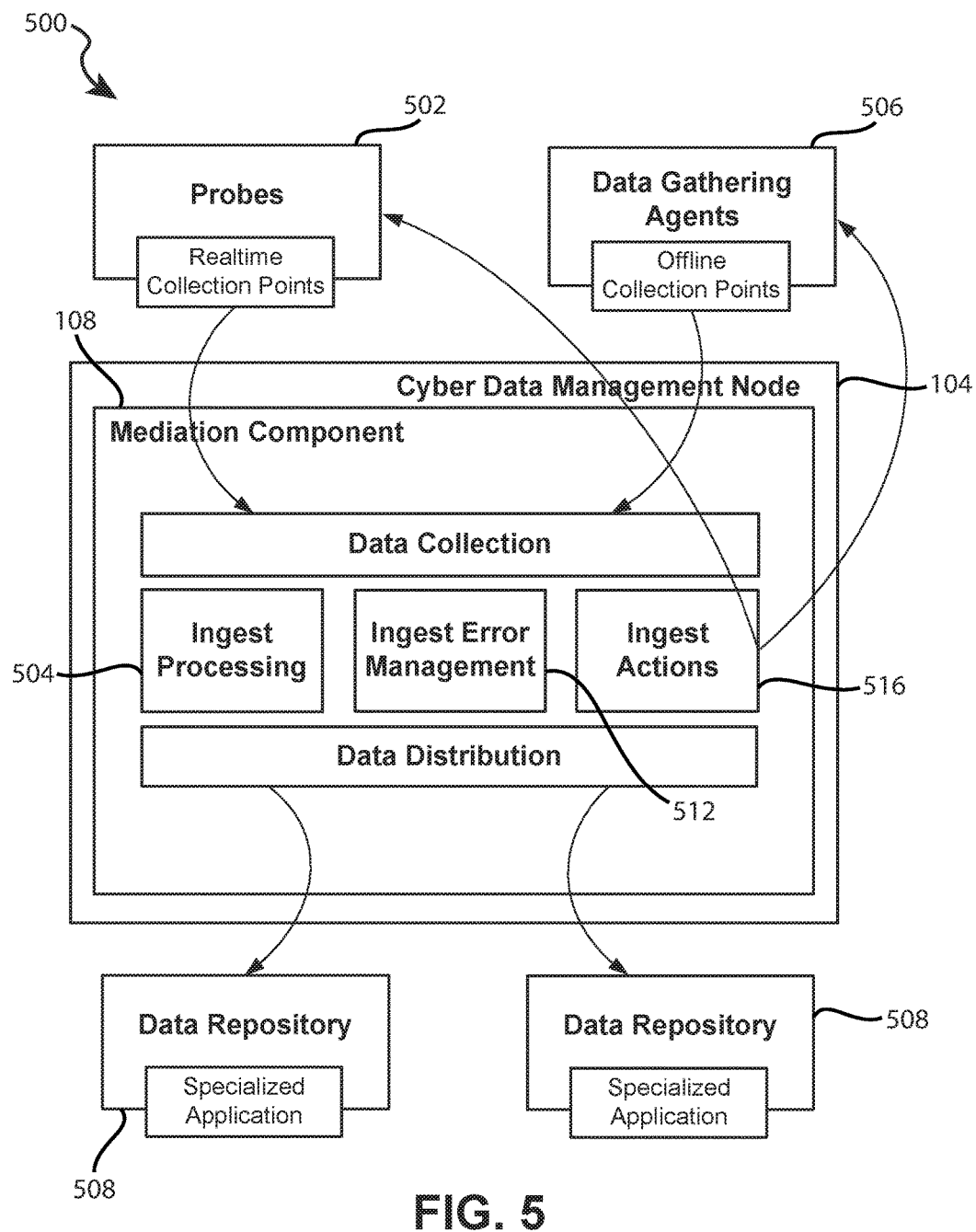
FIG. 5 illustrates an exemplary functional architecture of ingest, enrichment and mediation component capabilities of a cyber-data management node of FIG. 1.

FIG. 5 illustrates an exemplary functional architecture of ingest, enrichment and mediation component capabilities of a cyber-data management node 104. As described above, the cyber-data management node 104 may be component of a larger cyber security system. As shown in FIG. 5, the ingest, enrichment, and mediation capabilities of the architecture can be incorporated into a mediation component 108, such as the one shown in FIG. 1.

The mediation component 108 may have an ingest capability or an ingest processing component 504 that is configured to receive data from any active or passive network probes 502. This process is referred to herein as forward-mediation. Near real-time response (e.g., instantaneous to <5 minutes) may be achieved by correlation and pattern analysis "in the flow" from the ingest component 504 performing forward-mediation. The ingest processing component 504 may also receive potential threat data from other sources such as external databases 506.

The ingest processing component 504 may be a component of the mediation module 108 and may be configured to receive probe data from multiple probes of different capabilities and characteristics; normalize the probe data to a common analytical format; and correlate observed patterns observed across multiple probes. For example, in a DDoS solution architecture the ingest processing module 504 may receive data from collection points of information throughout the monitored networks. Some collection points may be real time (intrusive active probes) and others may be passive/offline (data gathering agents). An example DDoS architecture may also contain repositories 508 of information that hold the details of network usage for statistical and investigative analysis. The cyber-data management node 104 is positioned in and functions in the mainstream of the traverse of IP traffic. Thus, changes to the various network devices may not be required to support the capabilities of the cyber-data management node 104. The cyber-data management node 104 accepts information from the collection points, interprets the data with conditioning processes, and provides the results to the data repositories 508.

Stated in a different manner, the conditioning process allows outputs from all or nearly all sensors and other network devices to appear to all have the same data format and communications protocol. The cyber-data management node, in this configuration sense, functions as a universal translator, and can take information from all the reporting network devices and send that translated (transformed) information directly to the security event information manager (SEIM). In this way, no integration is required to allow that SEIM to receive information from the entire network and that SEIM's ability to correlate on incidents across the enterprise is increased. Using this configuration capability, the cyber-data management node can also translate information (raw data, logs, or even commands) from a management console so that the downstream device can be managed by the console without integration and development work. Various embodiments include a universal translator ability that can allow a diverse set of proprietary devices to all act as open source, or previously integrated set of tools.

Based on the ingested data, the mediation component 108 may be configured to instruct any number of probes or other network control devices to provide additional information or change their configuration through the operation of an ingest action module 516. The ingest actions component 516 may be an activation module that coordinates and instructs response actions to multiple probes or other network control devices. This process of coordinating and instructing response actions is referred to herein as reverse mediation. In some instances, one or more of data repositories 508 may function as an analytical or back-end database. In accordance with some embodiments, human analysis of emerging patterns in the back-end database may be employed to generate a reverse-mediation response from analytical tools. The mediation component 108 may also have an ingest error management module 512 that is configured to identify errors in the ingested data and to provide for the development of automated handling routines to deal with similar errors in the future.

The mediation component may 108 be designed for ingest, transformation, manipulation and distribution of data at high-volume and integrity. Each data stream type may be directed into one or more data flow processing paths. In a cyber-security system, the mediation component 108 may be used to ingest and analyze cyber sensor and log data from the enterprise network, and to reduce these high-volumes into discrete, actionable "triggers" to be sent to the activation component 116.

Referring again to FIG. 1, the diagram shown therein includes an example flow of sensor feeds, triggers and other data between the various components of the cyber-data management node 104. As show in FIG. 1, inbound data feeds may include sensor data feeds and trigger event feeds routed to the mediation component 108 and the activation component 116, respectively. The mediation component 108 may be configured to receive information from a variety of commercial and proprietary sensors and upstream systems in a variety of formats. Sensor information can be formatted, collated, validated, filtered, and enriched according to project specifications, then routed to the activation component 116 for workflow purposes. Real-time trigger event feeds of actionable items can be directly accepted by the activation component 116 in various formats to initiate pre-configured workflows. These workflows may initiate an action directly, or may be queued for selection in a reporting module by an end user.

Activation Component

As described above in connection with FIG. 1, a cyber-data management node 104 in accordance with embodiments discussed herein may include an activation component 116 that is configured to respond to manual triggers and/or triggers received from the mediation component 108 by controlling and/or managing disparate network elements to mitigate cyber-security threats. Through the operation of the activation component 116, the cyber-data management node 104 can respond actively to recognized events or by manual direction to control and manage many disparate network elements, via many old and new protocols, to effect an active response to a recognized threat.

A cyber-security system in accordance with embodiments discussed herein may employ an activation component 116 having flow-through functionality. As used herein, "activation" is the process of managing multiple, disparate network elements with a common, high-level command or API interface. The use of an activation component 116 in a given implementation, such as an overall DDoS solution architecture, provides an ability to initiate the configuration, activation, or deactivation of devices/applications to conduct actions, such as, surveillance, sniffers, network blocking, as well as activating new elements within the network.

The activation component 116 may be configured to allow users to implement new business rules for network element control as investigations evolve. In accordance with disclosed embodiments, the activation component 116 is a fully automated, flow-through platform that can accommodate dissimilar networks, technologies, and infrastructures. The activation component 116 architecture is highly scalable and flexible, and supports integration with multiple types of external systems using many types of communications and control protocols.

The activation component 116 operates by receiving a request from an external source or application. The activation component 116 processes these high-level requests using defined business rules to decompose the requests into separate activation actions, which are then directed to a specific device (network element). Each activation action identifies specific device commands and protocols required to complete the request. Once all of the dependent activation actions are complete, the activation component 116 sends an appropriate response back to originator, completing the request process.

The activation component 116 communicates with controlled systems and issues commands to these systems to accomplish actions specified in pre-configured workflows, or action plans which are specifically targeted towards security incident remediation. The nature of these systems varies according to the controlled environment, and may include (but not be limited to) devices such as firewalls, IPS (intrusion prevention systems), HBSS (host-based security systems), routers, and virus prevention systems.

In accordance with disclosed embodiments, the activation component 116 is a multi-service platform that enables users to build complex triggering rules and decompose these triggering rules into a series of specific tasks. The activation component 116 can also provide pro-active responses to particular thresholds of events which can be pre-defined by a network administrator. The activation component 116 also provides alarms, e-mails, or other specific notifications to individuals, groups, or devices that require specific and immediate attention.

The activation component 116 may be designed to accept trigger events and to execute pre-planned workflows so as to communicate and control one or more networked devices or device managers. The activation component 116 supports multiple triggers and workflows such that each workflow is capable of communicating with multiple, heterogeneous devices to effect specific pre-planned configuration changes to network devices. The configuration changes, although pre-planned, may be parameterized based on querying the current state of device(s) current state first and/or querying one or more network reference tables. Trigger events may come to the activation component 116 directly from external sources, or may be generated by the mediation component 108 as a result of ingest and analysis of sensor data feeds. Trigger events may also be generated by a reporting interface as a result of user actions.

The activation component may also receive direction from a user interface, directed by a human in the loop orchestrating the remediation efforts of a security event. In accordance with disclosed embodiments, the activation component 116 is an integrated, workflow driven, device control system capable of operating in a single-server, clustered server, blade server, or virtual machine operating environment. The activation component may coexist on the same server platform as the mediation component 108 of the cyber-security system provided the server is appropriately sized and tuned. However, for optimum flexibility and performance, separate server platforms may be used for each component.

In exemplary implementations, the cyber-data management node 104 employs an activation component 116 for mitigation. In accordance with embodiments discussed herein, the role of an activation component 116 in the cyber-data management node 104 may include: reconfiguring the network probes based on user defined criteria; alerting other devices, firewalls and/or systems of an anomalous condition; and configuring these other devices with anomaly-specific filtering rules.

Back-end aggregation and analysis of normal patterns of network behavior and ongoing analysis of current network behavior can be provided in the activation component 116. Reverse-mediation capabilities may be used to coordinate and control the actions of network devices in direct response to threat identifications to cut off or otherwise mitigate the propagation of the DDOS attack. These devices may include, but are not limited to the following: active or passive network probes; border gateway devices; and firewalls.

A standard set of actions may defined within the activation component 116 to mitigate known forms of DDOS attacks or other attacks, for example, by instructing a set of firewalls to block packets which match specific criteria which have been isolated from analysis of this specific attack. This set of instructions may be encoded as business logic within the activation component 116 and may include issuing a command to a device, or querying other devices to further clarify the situation and conducting conditional dialogue with the set of network devices.

Certain embodiments provide a security analyst with a graphical user interface (GUI) from which dialogues may be initiated. The activation component 116 may provide diagnostic trace information which can show to the analyst individual device interactions if appropriate. The activation component 116 may additionally provide a summary interface identifying which devices were successfully affected, or which failed in the attempt. The same set of device management dialogues may also be initiated automatically by the mediation component 108 during the stream analysis if the DDOS method or other attack mitigation method is automatically recognized. Accordingly, no additional devices are required for mitigation.

Cyber-security system components in accordance with embodiments discussed herein are capable of being configured to interact with enterprise authentication services such as CASPORT, in accordance with project plan specifications.

Embodiments may also provide back-end aggregation and analysis of normal patterns of network behavior and on-going analysis of current network behavior. Further, additional devices can cooperate as part of the total solution, and the capability of the activation component 116 reverse-mediation can be used to coordinate and the control the actions of these devices in direct response to shutting down or otherwise mitigating the propagation of a cyber-attack. Devices that can be coordinated and controlled include, but are not limited to: active or passive network probes; border gateway devices; and firewalls.

Reporting Component

As described above in connection with FIG. 1, a cyber-data management node 104 in accordance with embodiments discussed herein may include a reporting component 112 is configured to receive ingested data from the mediation component 108 and to make the ingested data available for interrogation. In so doing, the reporting component 112 may provide a dynamic window into the ingested data. The reporting component 112 may provide methods of interrogating the ingested data set with logical, rational, and substantive queries to produce a revealing view of the content based on summarization and aggregation over multiple attributes.

The reporting component 112 may be configured to provide for dissemination of cyber-security data and for collaboration between various cyber-security personal. It may be the case that business rules implemented by a system cyber-security change over time. New processing algorithms and configurations may be created when more knowledge is gained or when new information is introduced. The reporting component 112 may facilitate these transitions and changes by disseminating new configurations and rules so that these configurations and rules are applied to the different instances of the solution.

In certain instances, reference data feeds may be accepted by a reporting component 112. The reference data feeds may originate in the mediation component 108 and/or other processes according to project specifications. Data from the reference data feeds may be used to assist in configuring the cyber-security system and provide further information to support reporting and analytics.

The reporting component may 112 may use Oracle database technology to provide advanced, customizable reporting, queries, and analytic functions to others components of the cyber-security system. Here, The reporting component may 112 may implement database management routines that support high volume summarization, aggregation, presentation and query over any number of data attributes, with drill down to detail records. The reporting component 112 can coexist on the same server platform as the Oracle component. The reporting component 112 may be responsible for managing the Oracle database loading and partition maintenance tasks, and for the structures built to support required analytic views into the database at the required performance levels. Other database platforms (PostgresSQL, etc.) may also be used in addition to or in lieu of Oracle to meet certain specific project requirements.

The reporting component 112 may be configured to accept information from the mediation component 108 and the activation component 116, either through files or by direct database connection. In addition, the mediation component 108 and the activation component 116 component can leverage reference data that is controlled by the reporting component 112 to provide bi-directional interaction and integration. This reference data may originate from other network products or from customer-required sources in a variety of formats.

Cyber-Data Management Node Operations

Figure 6:
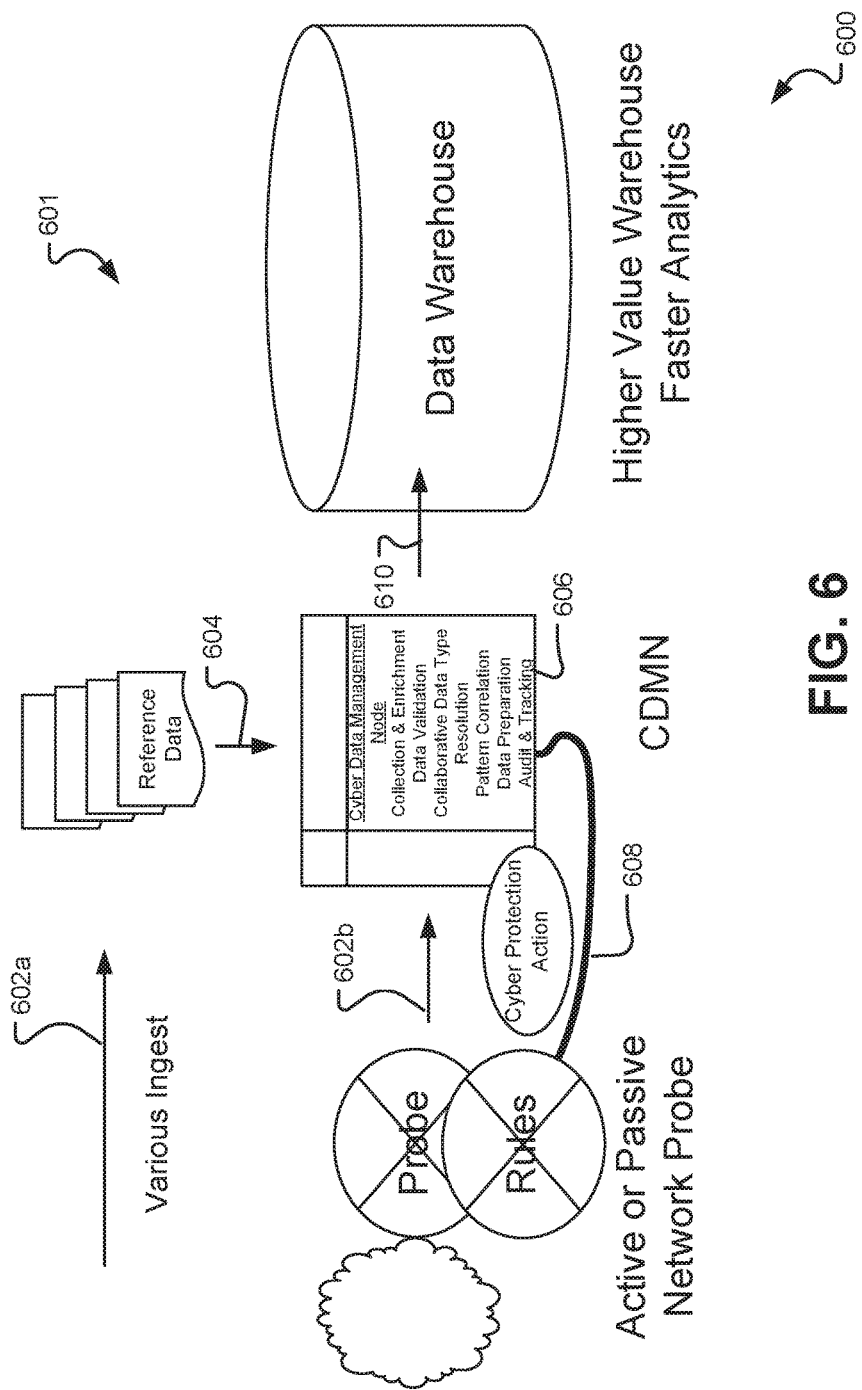
FIG. 6 is a schematic illustration of one exemplary configuration of a cyber-security system embodiment that is deployed in a network.

FIG. 6 is a schematic illustration of one exemplary configuration of a cyber-security system 601 that is deployed in a network 600. The cyber-security system may include a cyber-data management node 104, such as the one illustrated in FIG. 1. The cyber-data management node 104 may be viewed as a correlating engine for attack detection. Specifically, the cyber-data management node 104 uses a mediation component 108 to collect data from multiple probes and correlates the data to recognize an attack. The cyber-data management node 104 then uses an activation component 116 to coordinate the reactive steps required. The cyber-data management node 104 can service multiple probes or a single probe depending on service requirements. Each cyber-data management node 104 can feed its own data repository, or a network of cyber-data management nodes 104 may feed a single repository. A cyber-data management node 104 may be a component of or complement to a total DDoS detection and reaction solution and may include ingest, enrichment, and mediation components or modules as mentioned above and further described below. Back-end aggregation, enrichment, and analysis of normal patterns of network behavior and ongoing analysis of current network behavior are provided to the ingest and mediation modules from network devices.

As shown in FIG. 6, the cyber-data management node 104 obtains IP network information as indicated at operation 602a, 602b. That information may come from myriad different network devices and formats. The cyber-data management node 104 is between the probe and the repository in the network and so is not directly exposed to attack vectors. However, it is neither a port nor a tap. It may be viewed as an extension of the probe providing programmable functionality across multiple probes to augment the packet level capability of the probe. It augments the functionality of any probe—passive or active, legacy or modern—by providing correlation and data enrichment services to the data stream directed to an analytic repository. The cyber security system can service multiple devices (probes, SIEMs) or a single device (probe, SIEM) depending on service requirements; each cyber-data management node 104 can feed its own repository, or a network of cyber-data management node 104 may feed a single repository. The cyber-data management node 104 may receive sensor and/or alert feeds through a security incident and event manager (SIEM) in addition to other intelligence analysis and sources.

The cyber-data management node 104 may use client-server architecture. In one exemplary embodiment, the client may be a Java-based GUI that communicates with the application engine through Simple Object Access Protocol (SOAP). The client uses a secure SSL connection. The physical interface can be a distinct Ethernet connection separate from the data collection and dissemination networks. The servers comprising the cyber-data management nodes 104 may be protected behind standard firewalls, routers and by use of non-routing IP addresses. The cyber-data management node 104 ingests, correlates, and automatically orchestrates the actions based on a defined workflow and which product in the solution provides the capability.

Probe data from multiple probes of different capabilities and characteristics are mediated or normalized to a common analytical format as indicated in operation 604. Network behavior information may include any of the following: active or passive network probes; border gateway session and IP logs; firewall logs; commercially available internet mapping enrichment sources; and limited availability (private or government) Internet mapping enrichment sources. Patterns observed across multiple probes (Intermediate) may be correlated as indicated in operation 606.

Coordinated response actions to multiple probes or other network control devices may be instantiated as indicated in operation 608. The cyber-security system takes automated or semi-automated action(s) depending on predetermined preferences, which can include manipulating routers, security software, desktops/laptops, or nearly anything with an IP address. In addition to rapidly adapting to protect perimeter systems, the system can extend the perimeter into the Internet Provider space (public or private) to keep links to the organization's Internet open and operable.

It also provides the foundation for responding in real time to advanced persistent threats (APTs) and other anomalies, minimizing damage from threats that emerge from within the protected network. Data information may be delivered to data repositories as indicated in operation 610 for additional analysis and insight to review patterns and modify/create new response actions. The data comprising the response, the IP address, and more may be presented in the data storage, analysis, and reporting module.

All the components of the cyber-data management node 104 can communicate activity messages and alarms to external monitoring systems (e.g., Tivoli or OpenView) using a variety of the methods listed above. Any activity message may be relayed to multiple such systems, using a combination of these methods. For example, a message may be sent via email to an interested person, logged to a local file for a permanent record, and communicated via SNMP to an OpenView system.

The cyber-data management node 104 requires a minimum number of personnel to operate the system. Collection, processing, and dissemination of data are automatic. Statistical analysis of network events is automatic. Alerts, based on the configured rules, can be issued automatically although a fulltime (24×7) staff is preferable to monitor the health of the system. A centralized event monitoring system may be used to hold events that cannot be interpreted. In accordance with embodiments discussed herein, common daily administrative tasks can be minimized by features of the cyber-data management node 104 including: automated processes for data collection, processing, and dissemination; automatic population of the data repository; automated analysis of network events; and automated alerts in an error and alarm logging (EAL) system.

Figure 7:
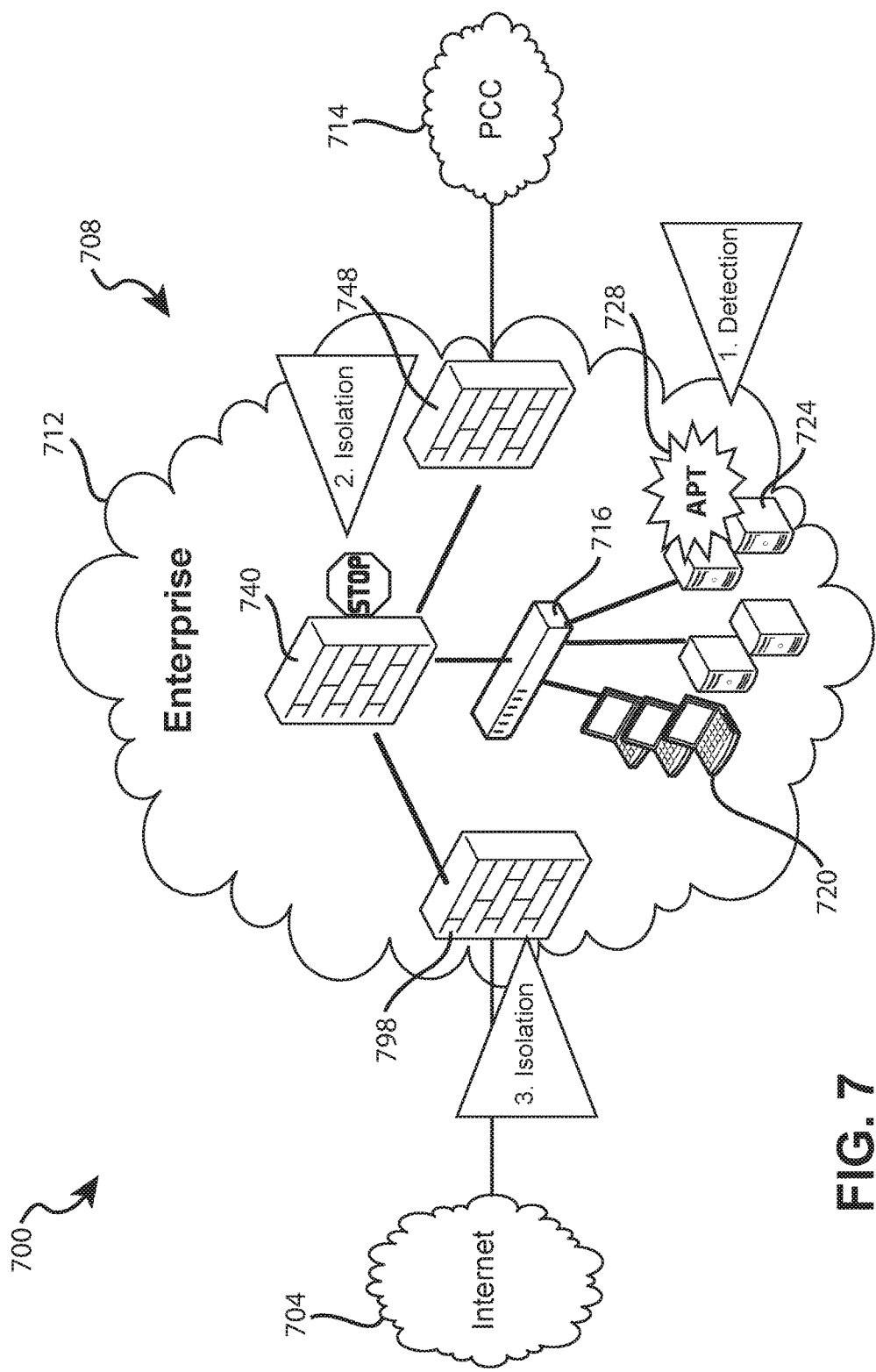
FIG. 7 is diagram that illustrates an example cyber-attack response in the context of an example network.
Figure 8:
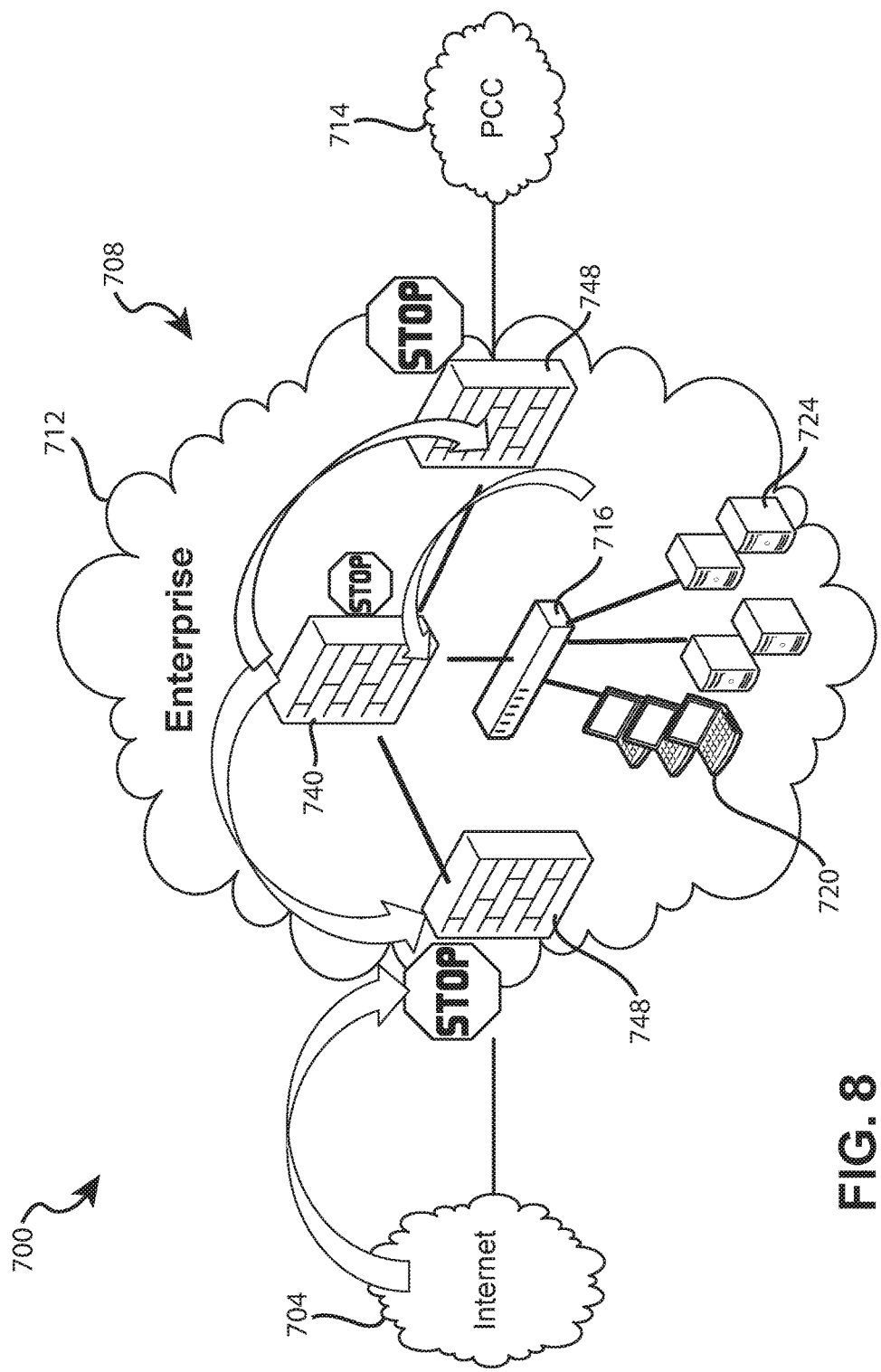
FIG. 8 is diagram that further illustrates the example cyber-attack response of FIG. 7.
Figure 9:
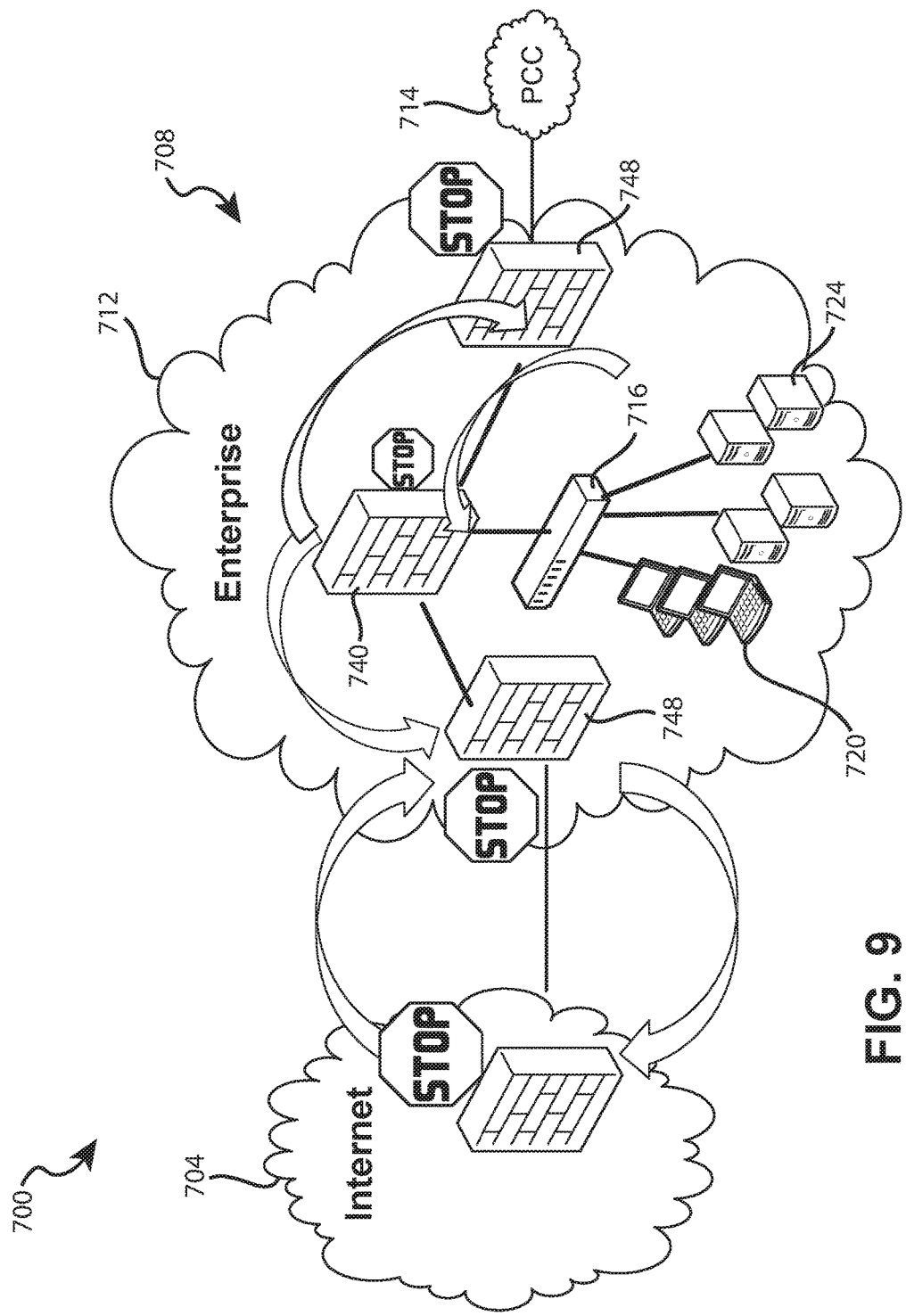
FIG. 9 is diagram that further illustrates the example cyber-attack response of FIG. 7.
Figure 10:
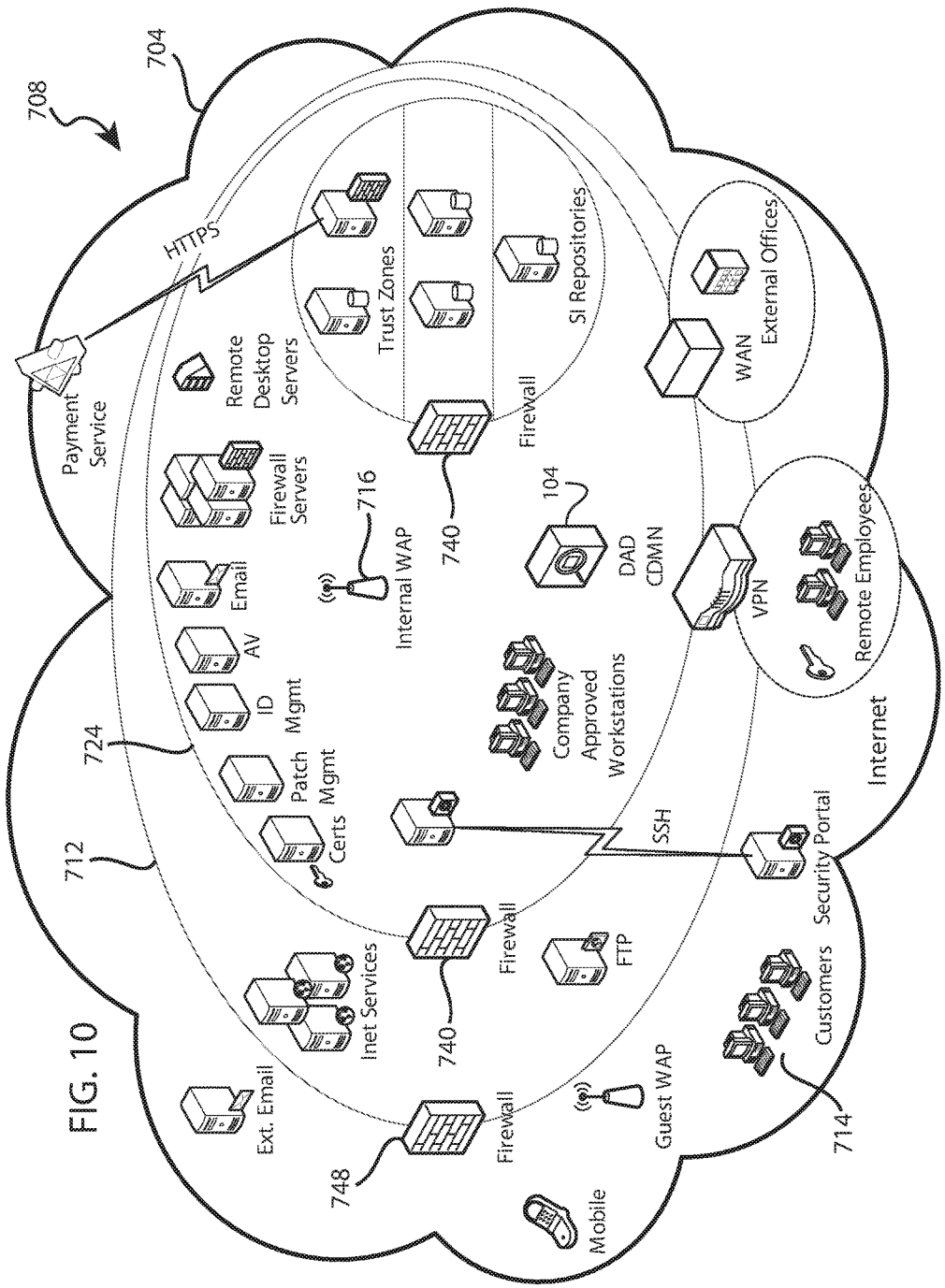
FIG. 10 is diagram that further illustrates the example network shown in FIG. 7.

By way of example, the cyber-data management node 104 operations illustrated in the following figures will be described with reference to the example cyber-attacks illustrated in FIGS. 7-9. FIGS. 7-9 illustrate the example cyber-attack in the context of an example network 700. The example network 700 is shown in greater detail in FIG. 10. The example network 700 includes an enterprise 708 that is defined by an enterprise perimeter 712. The enterprise perimeter 712 separates the enterprise 708 from external networks such as the Internet 704. By way of example, FIGS. 7-9 show a router 716 included within the enterprise 708. The router 716 may interconnect a number of computing devices such as laptops 720 and desktops 724. The enterprise 708 may also communicate with or otherwise be associated with one or more network partners, customer, or community member ("PPC") 714, which are location outsider of the enterprise perimeter 712. FIGS. 7-9 illustrate a cyber-security threat 728, which by way of example is an advanced persistent threat (APT). FIGS. 7-9 show that the example cyber-security threat 728 is detected as taking place inside of the enterprise 712, at a particular desktop 724. FIGS. 7-9 present a basic over view of the steps that the cyber-data management node 104 takes in responding to the cyber-security threat 728. Initially, the cyber-data management node 104 detects 732 the cyber-security threat 728. The cyber-data management node 104 then responds to the cyber-security threat 728 through one or more cyber-security actions or countermeasures that operate to isolate the cyber-security threat 728. By way example, FIGS. 7-9 show a first cyber-security action or countermeasure that isolates 736 the cyber-security threat 728 at an internal firewall 740. FIGS. 7-9 additionally show a second cyber-security action or countermeasure that isolates 744 the cyber-security threat 728 at an external firewall 748.

As shown in FIG. 9, the cyber-data management node 104 may be used to extend the security perimeter beyond the perimeter 712 of the enterprise 708. Initially, the cyber-data management node 104 is alerted of the attack. After receiving the alert, the activation module 116 may automatically reconfigure the perimeter 712 and firewalls to stop the attack from processing. The activation module 116 may also automatically issue a change configuration command to the internet service provider (ISP) to shut down access. Thus, additional access and potential damage is stopped automatically, both in the monitored network and at the perimeter of the network cloud. The various cyber-security actions taken by the cyber-data management node 104 in responding to and mitigating the cyber-security threat 728 are discussed in greater detail below.

Network Threat Defense System Using Data Mediation and Automatic Workflow Activation In responding to the cyber-security threat 728, the cyber-data management node 104 may initiate one or more automated workflows. In one respect, an automated workflow may take specific cyber-security actions to counter the cyber-security threat 728. In another respect, an automated workflow may analyze the cyber-security threat 728 and present cyber-security personal with options for responding to the cyber-security threat 728. Thus, the mediation component 108 of the cyber-data management node 104 may initially receive a cyber-security alert regarding the cyber-security threat 728. The mediation component 108 may then analyze the cyber-security alert to determine or otherwise understand the security threat 728 to the network 700. The activation component 116 of the cyber-data management node 104 may then respond to the security threat 728 by initiating at least one automated action. The at least one automated action may include reconfiguring a network element, such as firewall 740,748 as shown in FIG. 7. As used herein, an "automated" network security action or a network security action that is automatically taken is an action that the cyber-data management node 104 takes without specific input from security personal as the cyber-security attack is on-going.

Additionally, the mediation component 108 may map the security threat 728 to one or more preplanned responses based on the cyber-security threat. As used herein, "preplanned" cyber-security actions or responses include cyber-security actions that have been approved responding to a security threat prior to the current security threat 728 occurring. Some preplanned cyber-security actions or responses may be automatically executed. Some preplanned cyber-security actions or responses may presented to cyber-security personal as the threat is on-going and executed in response to input from the cyber-security personal. Thus, the activation component 116 may further respond to the security threat 728 by initiating at least one mapped preplanned response, the mapped preplanned response corresponding to a selection made by network security personal. Once the security threat 728 is mitigated, the reporting component 112 the cyber-data management node 104 may provide a security threat response report that includes data regarding the at least one automated action, mapping between the security threat and the one or more preplanned responses, and selection of a mapped preplanned response by network security personal. Automated work flows are discussed in more detail in connection with FIGS. 11 and 12A-B.

Figure 11:
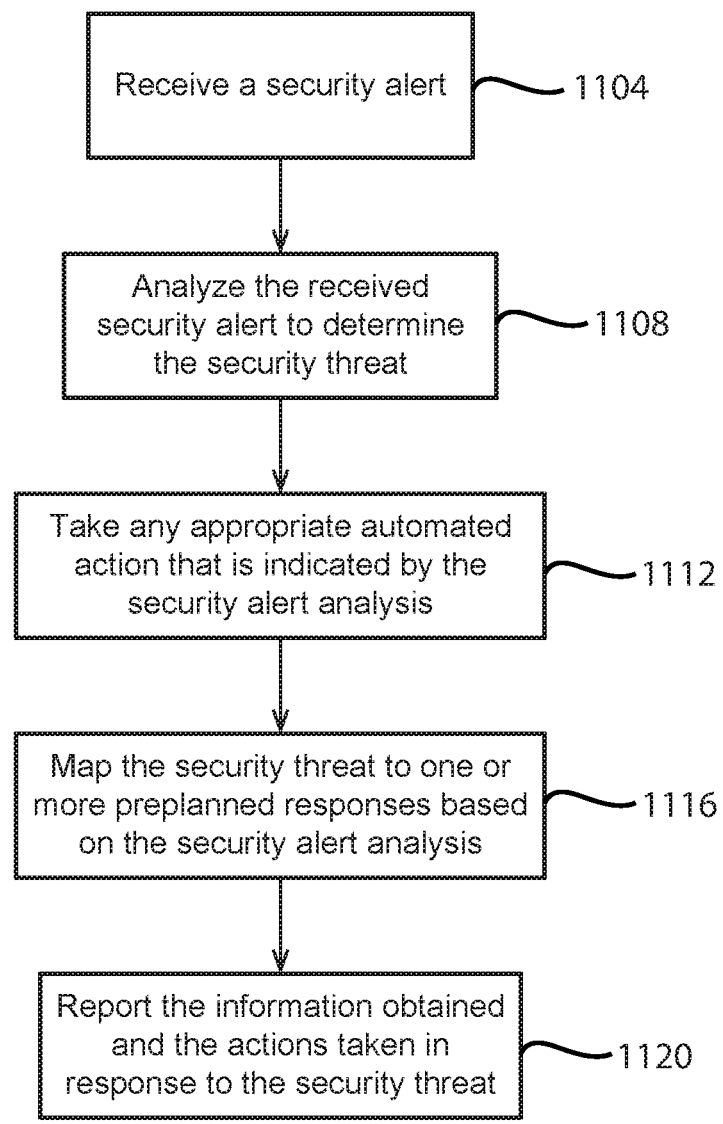
FIG. 11 is a flow chart that illustrates operations of the cyber-data management node 104 in accordance with embodiments discussed herein.

FIG. 11 is a flow chart that illustrates operations of the cyber-data management node 104 in accordance with embodiments discussed herein. Initially, in operation 1104, the cyber-data management node 104 receives security alert. In some instances, as shown in FIG. 7, the security alert may indicate an internal attack that originates from inside the enterprise 708, for example, from a desktop 724. In other instances, the security alert may indicate an external attack that originates from outside the enterprise 708, for example, from the Internet 704. Operation 1108 may be executed following operation 1104.

In operation 1108, the cyber-data management node 104 analyzes the security alert received in operation 1104. More specifically, the mediation component 108 ingests data regarding the security alert and data from other source if available. The mediation component aggregates the data that is available from the various sources and in so doing compiles an informative picture of the security threat, if one exists. Operation 1112 may be executed following operation 1108.

In operation 1112, the cyber-data management node 104 takes any appropriate automated action that is indicated by the data aggregated in operation 1108. Here, the activation component 116 coordinates or controls network devices without any specific human intervention. In the event of an external attack, the mediation module 108 may trigger the activation module 116 to instantly reconfigure the network perimeter 712 and firewalls to stop the attack all in machine speed. In the event of an internal attack as shown in FIG. 7, the mediation module 108 may trigger the activation module 116 to block external communication to and from infected machine(s), such as by reconfiguring the router 716, so that the infected machine are isolated. The activation module may also be triggered to block or other reconfigure the perimeter 712 to contain the attack within the perimeter 712. Operation 1116 may be executed following operation 1112.

In operation 1116, the cyber-data management node 104 maps the security threat or threats that were discovered in operation 1108 to one or more preplanned responses. The preplanned responses may be mitigation actions approved by security personal but not incorporated into the automated responses taken in operation 1112. In the event that a particular security policy does not implement any of the above as automated actions, these actions may be mapped to security alert as a preplanned response. Thus, in event of an external attack, the mediation module 108 may map reconfiguration of the network perimeter 712 and the firewalls to the security alert so that these actions may be taken quickly by security personal that respond to the security alert. Similarly, in event of an internal attack as shown in FIG. 7, the mediation module 108 may map blocking of external communication to and from infected machine(s) so that so that these actions may be taken quickly by security personal. Once security personal selects a response that the mediation module 108 has mapped to the security alert, the activation module 116 is triggered to respond to the security alert by executing the preplanned action or actions. Operation 1120 may be executed following operation 1116.

In operation 1120, the cyber-data management node 104 reports the information obtained and the actions taken in response to the security alert received in operation 1104. Here, the threat is mitigated and disabled and the server or other computing component is available to support the investigation or forensics. Accordingly, the reporting component 112 may report the automated actions taken in operation 1112. Additionally, the reporting component 112 may report the mapping between security threats and preplanned responses that was established in operation 1116.

Figure 12:
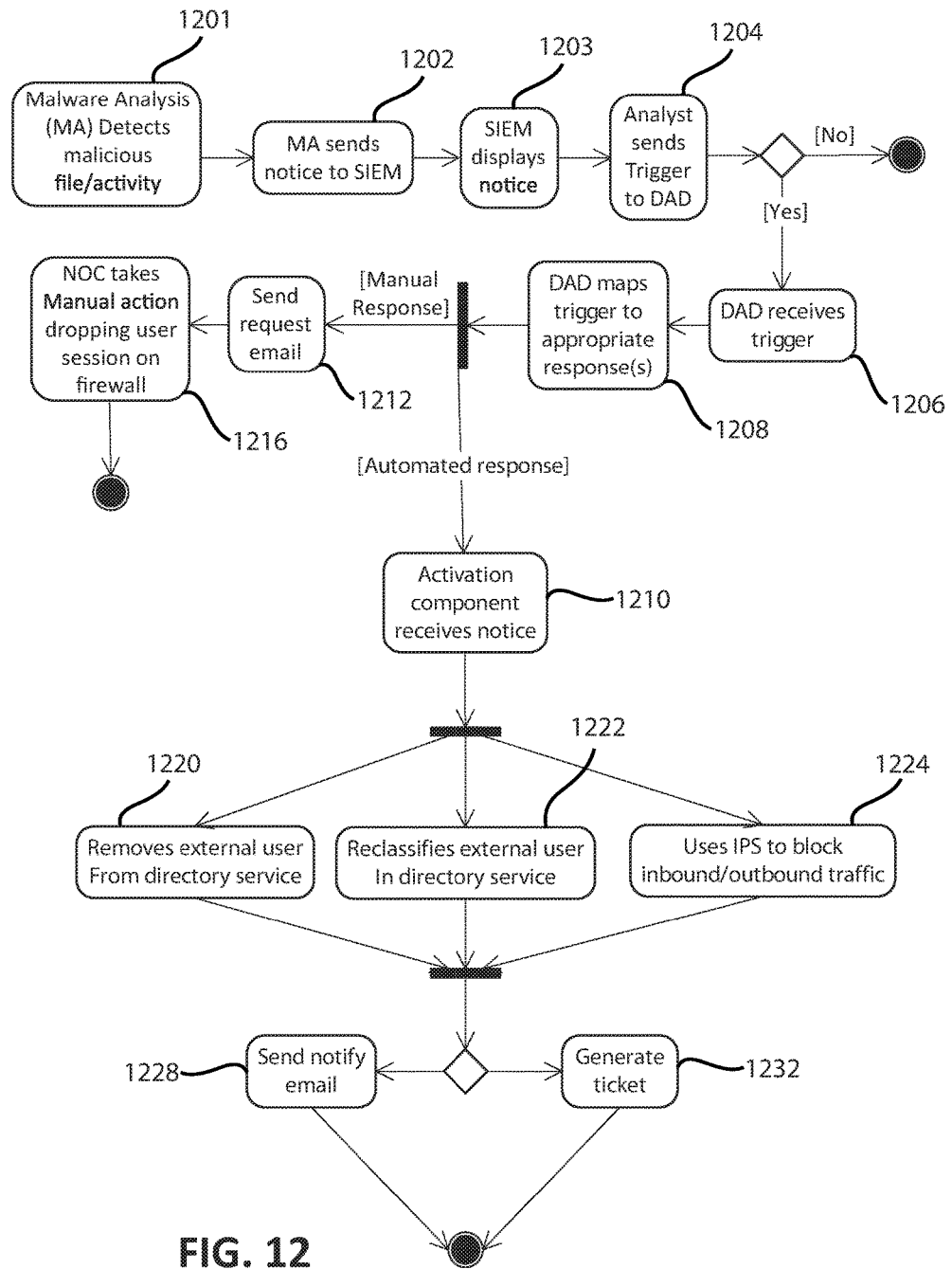
FIG. 12 illustrates a further example of process flow performed in an exemplary cyber security system having the cyber-data management node of FIG. 1.

FIG. 12 illustrates a further example of process flow performed in an exemplary cyber security system having a cyber-data management node 104. Initially, in operation 1201, a malware analysis (MA) component may detect a malicious file or other malicious activity. In operation 1202, the malware analysis component then sends notice of the malicious file or malicious activity to the SIEM 204. In operation 1203, the SIEM 204 displays the notice received from the malware analysis component. An analyst may then review the notice and determine if the dynamic adaptive defense (DAD) functionality of the cyber-data management node 104 should be triggered. If the DAD functionality is not be triggered, the process flow may end at operation 1204. If the DAD functionality is to be triggered, the process flow may continue such that the DAD functionality receives the trigger (operation 1206). In operation 1208, the cyber-data management node 104 maps the trigger to appropriate cyber-security responses. In some cases, cyber-security responses are automatically manually triggered by an email or other commination (operation 1212) sent to an administrator or network security person. In response, network security may take action such as dropping a suspicious user session on a firewall (operation 1216). In other cases, cyber-security responses are automatically triggered when the activation component 116 is so notified (operation 1210). In response to being notified, the activation component 116 may take various network security actions or countermeasures including removing an external user from directory service (operation 1220), reclassifying the external user in the directory service (operation 1222), and/or using an IPS to block inbound/outbound traffic (operation 1224). The activation component may report the action taken by sending an email or other communication (operation 1228) and/or generating a ticket (operation 1232).

Data Enrichment

The cyber-data management node 104 may also create an expanded data set for use by network security personal in responding to the cyber-security threat 728. Specifically, the mediation module 108 may receive the cyber-security alert for a cyber-security attack 728 and compile information regarding attack. Here, the mediation module 108 may continually compile and analyze cyber-security information until a threshold amount of information regarding the cyber-security attack is obtained. Following this, the reporting component 112 may output an expanded data set for the cyber-security attack including at least a portion of the complied information. In one embodiment, the reporting component 112 displays a graphical user interface with at least one icon that represents an identified source of the cyber-attack, receives user input that selects the at least one icon, and displays at least a portion of the expanded data set responsive to the user input. Expanded data sets are discussed in more detail in connection with FIGS. 13 and 14.

Figure 13:
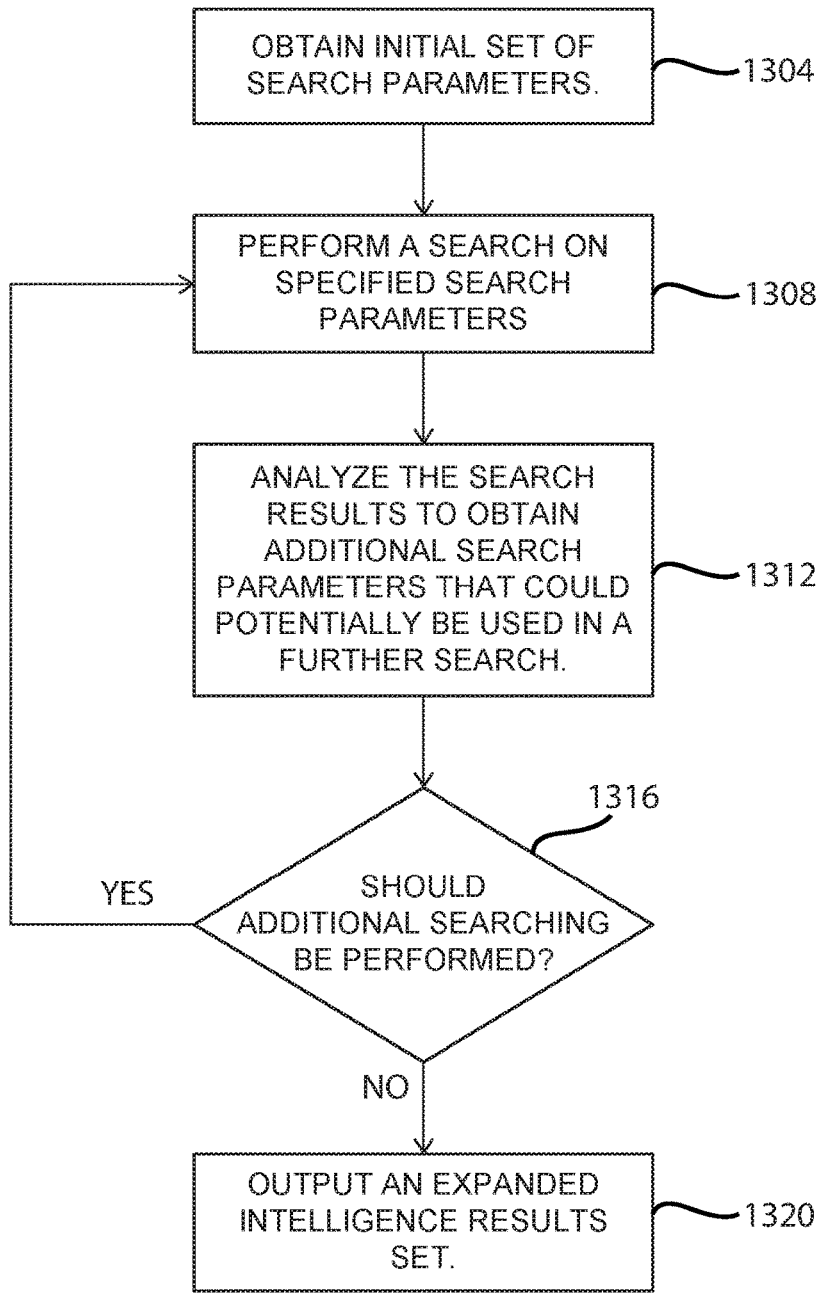
FIG. 13 is a flow chart that illustrates further operations of the cyber-data management node of FIG. 1.

FIG. 13 is a flow chart that illustrates operations of the cyber-data management node 104 in accordance with embodiments discussed herein. Initially, in operation 1304, the mediation component 108 obtains a first set or initial set of search parameters. The initial set of search parameters may contain information related to a security alert received at the cyber-data management node 104. In some instances, as shown in FIG. 7, the security alert may indicate an internal attack that originates from inside the enterprise 708, for example, from a desktop 724. In other instances, the security alert may indicate an external attack that originates from outside the enterprise 708, for example, from the Internet 704. Operation 1308 may be executed following operation 1304.

In operation 1308, the mediation module 108 performs a search on specified search parameters. Here, the mediation component 108 performs a search on the first or initial set of search parameters. The mediation component 108 may receive data from any active or passive network probes. The data obtained may include a web address or IP address for the computing device from which the cyber-attack or suspicious network traffic is being initiated. The meditation component 108 may also receive potential threat data from other sources such as external databases. Once the search results are obtained, operation 1312 may be executed following operation 1308.

In operation 1312, the mediation component 108 analyzes the search results obtained in operation 1308 to obtain additional search parameters that could potentially be used in a further search. The mediation component 108 may achieve this result using a confidence engine, or analytical tool where pre-conditions, criteria and outcomes are defined based on defined search parameters. Here, the mediation component 108 aggregates the data obtained so far to provide a total picture of the current state of network traffic. The aggregated data may then be analyzed to determine if additional data is needed for a more complete understanding of potential cyber-threat. For example, the mediation component 108 may know a web address from which the attack is originating, but the mediation component 108 may not know other information such as the company or person that is registered as the owner of the website. Without this information, the mediation component 108 may not be able to correlate the web-address with malicious company information that could be provided by external databases. Thus, in this example, the company or person that is registered as the owner of the website could be saved as additional search parameter. The mediation component 108 may achieve this result using a fluid process for saving and passing results of one search to the next search in order to provide context to what the next search may be querying on. For instance, a website name may be a result that provides such a context. Once the mediation component 108 obtains the additional search parameters, operation 1316 may be executed following operation 1312.

In operation 1316, the mediation component 108 determines if additional searching is required or should otherwise be performed. If the mediation component 108 determines that additional searching is required, operation 1308 may again be executed following operation 1316. Here, the mediation component 108 performs a search on specified search parameters including the additional search parameters obtained in operation 1312. If, in operation 1316, the mediation component 108 determines that additional searching is not required, operation 1320 may then be executed. Here, the mediation component 108 may use analytic decision points to determine next steps, such as whether to continue to retrieve information, or stop because it has been determined that there is sufficient data to take an informed action on the threat.

In operation 1320, the mediation component 108 outputs an expanded intelligence results set. Here, sensor information may be formatted, collated, validated, filtered, and enriched. Referential data such as names, addresses, co-ordinates, adjective text, or any other additive value can be associated with sensor data. In accordance with embodiments disclosed herein, the mediation component 108 may deliver the expanded intelligence set through a graphical user interface (GUI) or similar mechanism.

Figure 14:
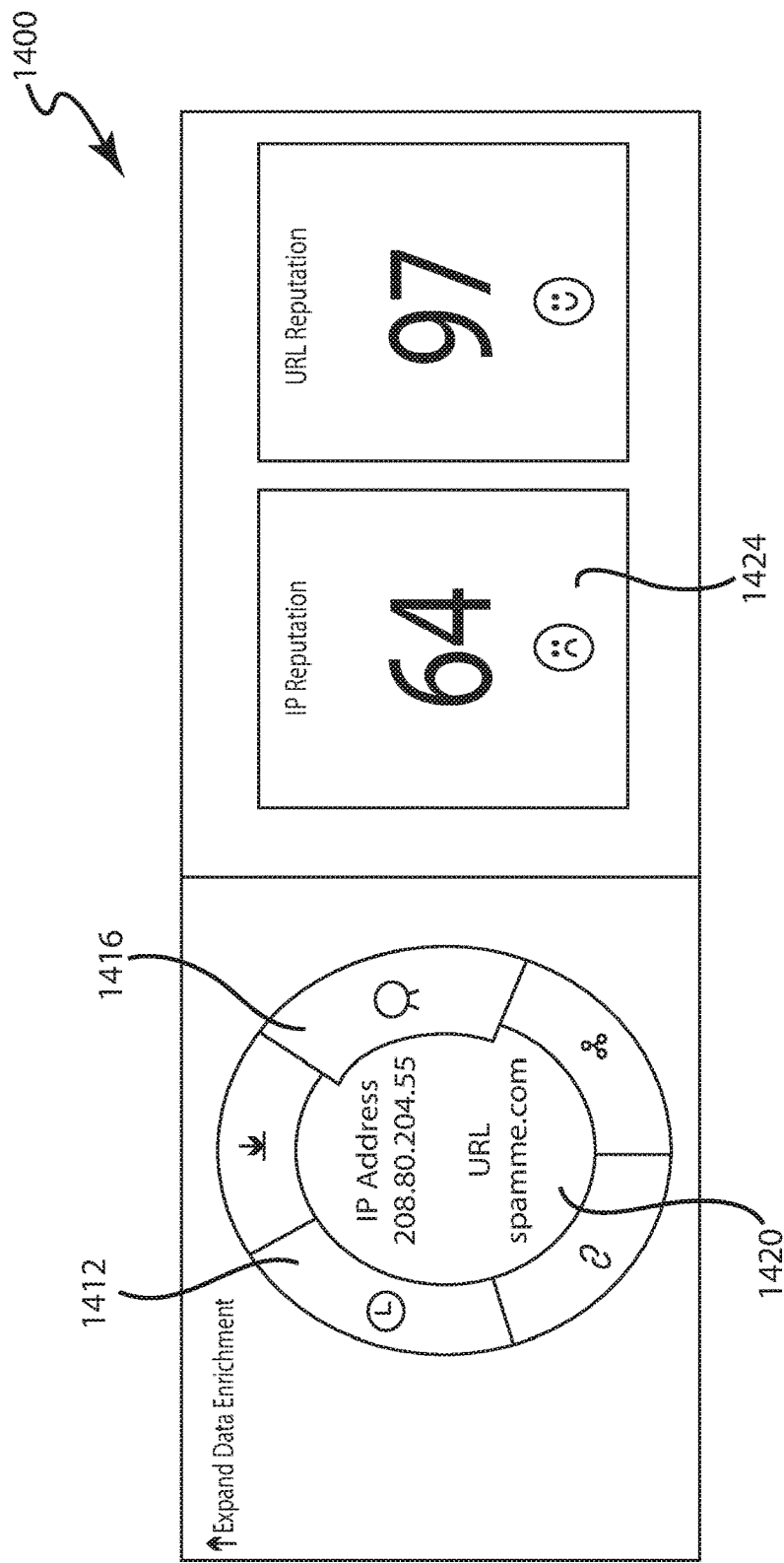
FIG. 14 is a screen-shot of an example graphical user interface used to deliver an expanded intelligence set in accordance with embodiments discussed herein.

FIG. 14 is a screen-shot of an example GUI 1400 used to deliver an expanded intelligence set. The example GUI 1400 includes an interactive tool 1412 that can be clicked-on or otherwise manipulated by user input. The example GUI 1400 additionally provides output to the user in response to selections or manipulations received through the interactive tool 1412. The interactive tool 1412 may have a number of selectable sections or icons 1416 that can selected for delivery of different information through the GUI 1400. The interactive tool 1412 may also have information display area 1420 that can be used to provide general information about current cyber security threats.

As shown in FIG. 14, the information display area 1420 may indicate that a cyber-security threat is detected or is being monitored as coming from a particular web address or IP address. Cyber-security personal or other users can then click-on or otherwise select the icons 1416 to receive additional or enhanced information regarding the cyber-security threat. The GUI 1400 may have a number of display panels 1424 that deliver the enhanced data. In this example, the display panels 1424 display numbers representing ratings or confidence levels for the web address or IP address associated with the attack. The ratings or other information may be derived from data ingest, recursive searching, iterative searching, or other mechanisms or procedures described herein. It should be appreciated that the GUI 1400 shown in FIG. 14 is shown by way of example and not limitation. Other GUIs, menus or displays that accomplish the function of delivering enhanced intelligence are within the scope of the invention.

The flow chart shown in the FIG. 13 and the GUI shown in FIG. 14 illustrate operations that can be executed in the formation of the data enrichment capability that are possible when applying telecom mediation and activation technologies to cyber security applications. The system may utilize an activation system such as a legacy telecom billing system to create a real-time threat awareness picture by using the rapid event commonality detection speed of mediation and the session based provisioning and reconfiguration capabilities of activation. Here, an initial (detection) event may trigger the system to go search all known repositories at machine speed looking for simple matches and good bad indicators to bring back immediately so security analysts can have an immediate idea of the credibility of threat, malicious intent, attack, etc. associated with the detection event. As good/bad indicators are returned, the system may then recursively perform more focused, but deeper searches to start retrieving what the analyst will likely need next, which is determined by the system's rule-sets. This immediate good/bad return from all known global and internal sources is extremely fast as it is only looking for the existence of the event subject (ex.IP address) in repositories that reference suspected and known bad actors. Bad finding can then be automatically searched for deeper context to return behind the Bad Finding indicator in the data enrichment view.

Disclosed embodiments may search globally through feeds, lists, subscriptions and posts, forums, event social network postings. Embodiments may also access internal logs and history records of all hardware and software across the enterprise to give an inside/outside view of findings and impact within the organization. Global and internal commonality searches can performed by this combination of telecom activation and mediation acting in a concerted fashion where the activation software initiates TCP/IP connections when commands are required to be performed, and mediation performs initial good/bad findings followed by recursive focused searches. This pairing of activation and mediation to orchestrate automated commonality searches with recursive tightening focus follow up searches is advantageous and allows for the practical use of massively large global threat data resources in immediate and machine speed fashion. Disclosed embodiments allow security personal to have an immediate and globally fed indication of risk, threat, and attack confidence.

Disclosed embodiments may leverage the global and internal commonality search capabilities described above so as to display a large wealth of global information so that it makes sense with a very quick look across the screen, without having to read large amount of text and numbers. The approach here is to first take the initial quick findings from the previously described commonality searches, which can show a binary, yes/no, match between the event alert subject, the item that caused the search to commence (like an IP address, a url, a file, etc.), and the repositories, services, feeds, etc that house known and suspected bad actors, and display them as the categories that they were in. For example, if the system performed a search on an IP address and URL pair (the url and its associated IP address(es)) and it was configured to search in repositories that contained information the following categories of information: History, IP Rep, Web Rep, Email (SPAM) Rep, Malware Rep, Botnet Rep.

An example recursive search could take place as follows. Initially, the system identifies a bad IP/URL finding. Following this, the system then builds associates between the bad IP/URL finding and people, companies, press/forums, and so on. Example associations for people include social networking matches, criminal record matches, public information matches, resume and job site matches, user name matches. Example associations for companies include related companies, related web sites, related IP addresses, social network matches, and so on. Following the search, the screen then shows graphical representations of History, IP Reputation, Web Reputation, Email (SPAM) Reputation, Malware Reputation, Botnet Reputation. Each graphic may then indicate if there was a match in that category, even though the search results were not initially brought back, only a match indicator is brought back on the first search. Subsequent searches perform recursive searches on areas that have findings and start pulling back that information or establishing click-through access to that information. This indication could be, for example, the icon turning red.

Following this, the security analyst could very quickly be able to glance at the screen and know if there was any bad information in the world's repositories on the IP/URL pair. If all is good, then the analyst doesn't have to click on anything, or even read. However, if one or more icons turn red, then the analyst knows there are negative findings on the IP/URL in question, and not only can establish an immediate reduced trust of the offending event, but the system will predict, based on the finding, that more results are likely to be needed, and it will have already brought the next level of data back for the analyst. Then when the analyst hovers over the icon he/she will see more summary information appear, like the name of the source of the negative finding within a particular category. When the analyst then clicks on/selects the icon, they will be taken to a full report of the information, one that has been structured via the data reduction, summarization, and correlation abilities of the telecom mediation technology.

Thus, disclosed embodiments may provide the analyst with the most pertinent information up front, giving him the ability to react faster without having to read through all the information retrieved in the search results. The type of information that is important to a security analyst can differ, so embodiments may provide the ability to configure a display pattern or order of fields based on each enrichment source. For example, an analyst utilizing enrichment sources specializing in malicious IP addresses and URLs may want to see the reputation score appear as the first field in the panel displaying this data. Further, analysts utilizing geo-location sources may want to see the country of the IP address appear first. In some embodiments, search results may not be returned in this particular order, but the system may provide the ability to customize the display pattern of the data. Embodiments can also dynamically adapt to new enrichment sources, taking in to account new threat intelligence feeds that a security analyst may choose to use. Thus, the user interface is adaptive and can display the data in raw form even when it has not been accounted for as part of a core product.

In accordance with various embodiments, a recursive search may be sequenced and presented in a GUI. Here, an IP address may create a security alert in the security operations center of an enterprise. The data enrichment process may then start. The data enrichment process takes the IP address and looks up the current URL that is associated with it. The data enrichment process then searches to find all previously known URLs that were registered to that IP address. The data enrichment process then builds a family tree (associations) of related IP addresses and URL and evaluates all of those addresses to return a good/bad finding on relatives (associations) of the original IP address. The data enrichment process may also search to find the name of the person that registered the URL that is associated with the IP address (as well as with the other URLs in the family tree). For illustration purposes consider the Bad IP/URL Findings—Associations recursion. When an IP address or URL has negative findings, the system can automatically go back and find the Point of Contact (POC) information of the person and company that registered the URL (if only the IP address is known the system may find any associated URL and then perform this step).

The system may then follow subsequent recursive search steps (or data parsing, whichever is needed) to find and return the cyber security information. For speed sake, only indicators may be pulled back from global searches, and then targeted deep searches may be designed to return only data that is expected to be needed, which may return the information in a just-in-time method). Items that have no information found may not be returned. Information that is returned can be returned as a link to go to the source, or as a mediation derived report. The report may include associates for people, companies, press/forums, and so on. Example associations for people include social networking matches, criminal record matches, public information matches, resume and job site matches, user name matches. Example associations for companies include related companies, related web sites, related IP addresses, social network matches, and so on. These categories represent possibilities, not limitations or requirements.

Graphical User Interface

Figure 15A:
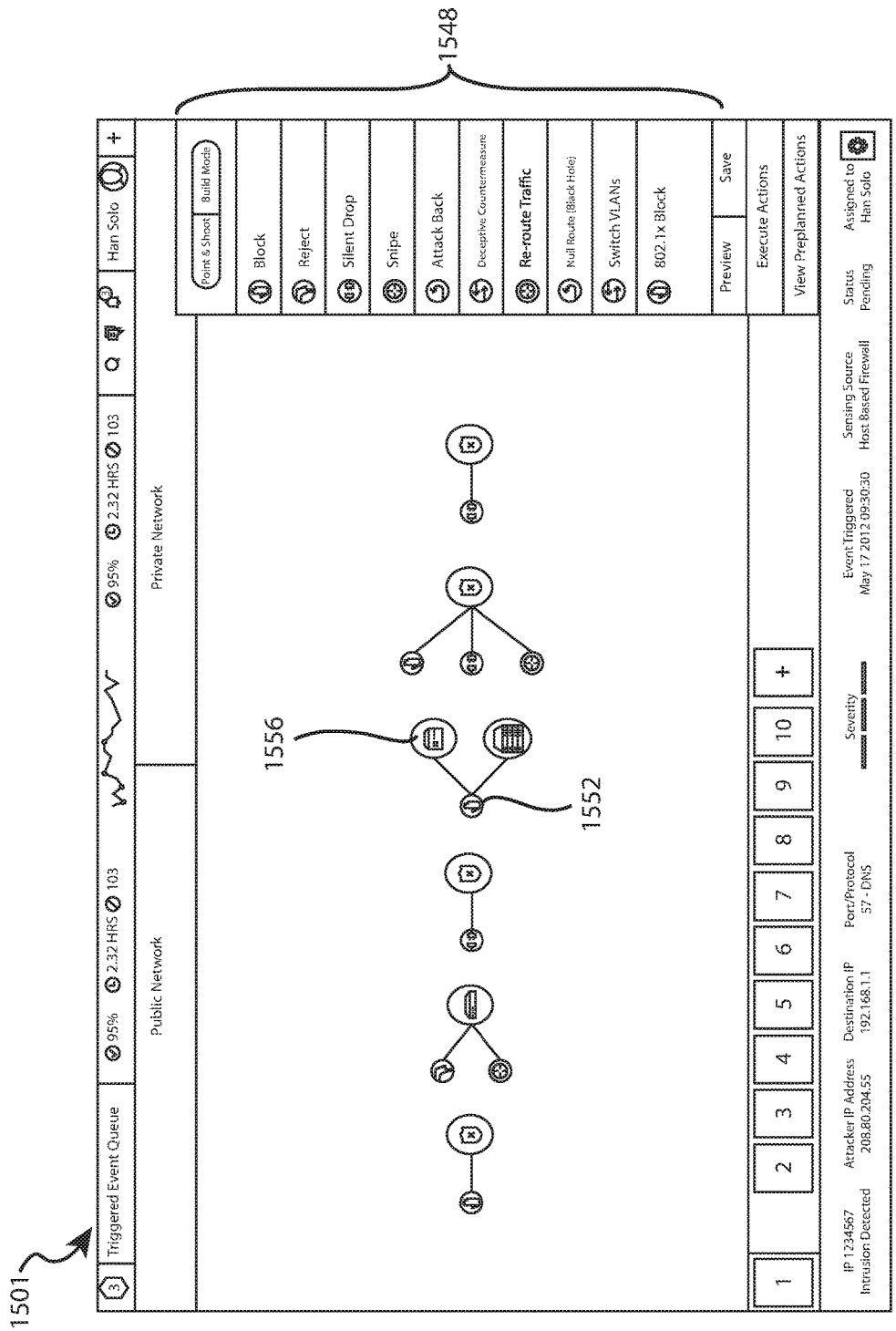
FIGS. 15A-E are screen shots of an exemplary interactive network maps and diagrams in accordance with embodiments discussed herein.
Figure 15B:
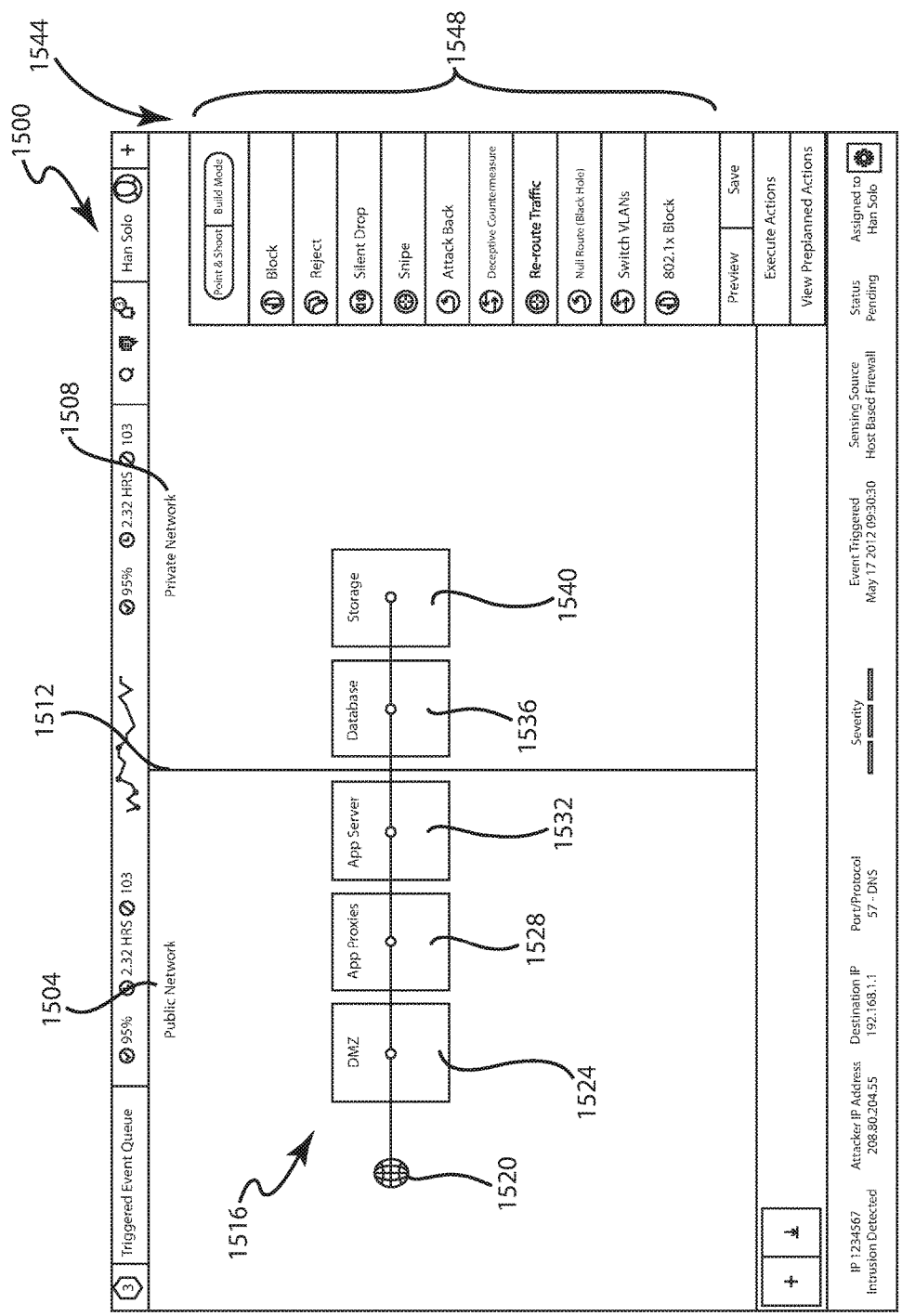

In responding to the cyber-security threat 728, the cyber-data management node 104 may present information to network security personal through a graphical user interface. In connection with presenting information in a graphical interface, the mediation component 108 may receive and analyze a cyber-security alert for a cyber-security attack 728 to determine a cyber-security response including at least one countermeasure to be applied to a network security element. As used herein, a "countermeasure" is an action taken by the system to counter or otherwise mitigate a cyber-security attack. Following this, the reporting component 112 may display a plurality of icons including a countermeasure icon representing a particular countermeasure and a network security element icon representing a network security element such that the countermeasure icon and the network security node are grouped together in a graphical user interface (FIG. 15A). The countermeasure icon and/or the network security element icon may be selectable by a user to cause the at least one countermeasure to be applied to the network security element.

In another embodiment, the mediation component 108 receives a cyber-security alert for a cyber-security attack, analyzes the cyber-security alert, and identifies a source of the cyber-security attack. Following this, the reporting component 112 displays an indication of the source of the cyber-security attack on a network security map (FIGS. 15D-E), displays a plurality of network security elements icons in the network security map, displays a plurality of cyber-security countermeasure icons in the network security map, and receives user input that correlates at least one of the network security element icons with at least one of the cyber-security countermeasure icons (FIGS. 15B-E). The activation component 116 may then apply a cyber-security countermeasure to a network security element responsive to the user input. Here, the applied cyber-security countermeasure may correspond to the at least one cyber-security countermeasure icon. The network security element to which countermeasure is applied may correspond to the at least one network security element icon. Graphical user interface embodiments are discussed in more detail in connection with FIGS. 15A-E.

FIGS. 15A-E are screen shots of an exemplary interactive network maps and diagrams in accordance with embodiments discussed herein. The example interactive network and diagrams shown in FIGS. 15A-E may be used by security personal in responding to an ongoing security threat. In some instances, as shown in FIG. 7, the security alert may indicate an internal attack that originates from inside the enterprise 708, for example, from a desktop 724. In other instances, the security alert may indicate an external attack that originates from outside the enterprise 708, for example, from the Internet 704.

FIG. 15A shows a sequencing diagram 1501 that shows several actions 1552 being associated with certain network elements 1556. When action sets for the interactive sequencing diagram 1501 are created, those that are to run in parallel or otherwise as a group can be displayed in the sequencing map of FIG. 15A as a grouping. The various groups can be displayed in an order in which they to run. For example, the grouping that runs first can be displayed on the far left, the subsequent group just to the right of first group, and so on. Thus, the sequencing map 1501 of FIG. 15B functions as a graphical representation of all of the automations that have been assembled and serves as a quick-glance reference before assembled action sequences are executed. Here, security personnel may define and configure a sequence of remediation steps or action plans. Multiple action plans may be defined by security personal. The action plan may serve as a digitized version of a manually run, standard operating procedure. The action plan may run, executing the specified device-action commands in a consistent manner, much faster than a human would.

Some of the network security actions 1552 displayed in FIG. 15A may be executed automatically without specific user input. Other actions network security actions 1552 displayed in FIG. 15A may be executed in response to user input, such as the user selecting the either the action 1552 icon or the network element 1556 icon. The sequencing diagram 1501 may display the various network security actions 1552 in the order in which they are to be executed in responding to the cyber-security threat. Selecting a particular action 1552 icon may cause the action 1552 to be applied to the network security element 1156 with which the action 1552 is grouped in the sequencing diagram 1501. Selecting a particular network element 1556 icon may cause all of the actions 1552 with which the element 1556 is grouped with in the sequencing diagram 1501 to be applied to the selected network security element.

Figure 15C:
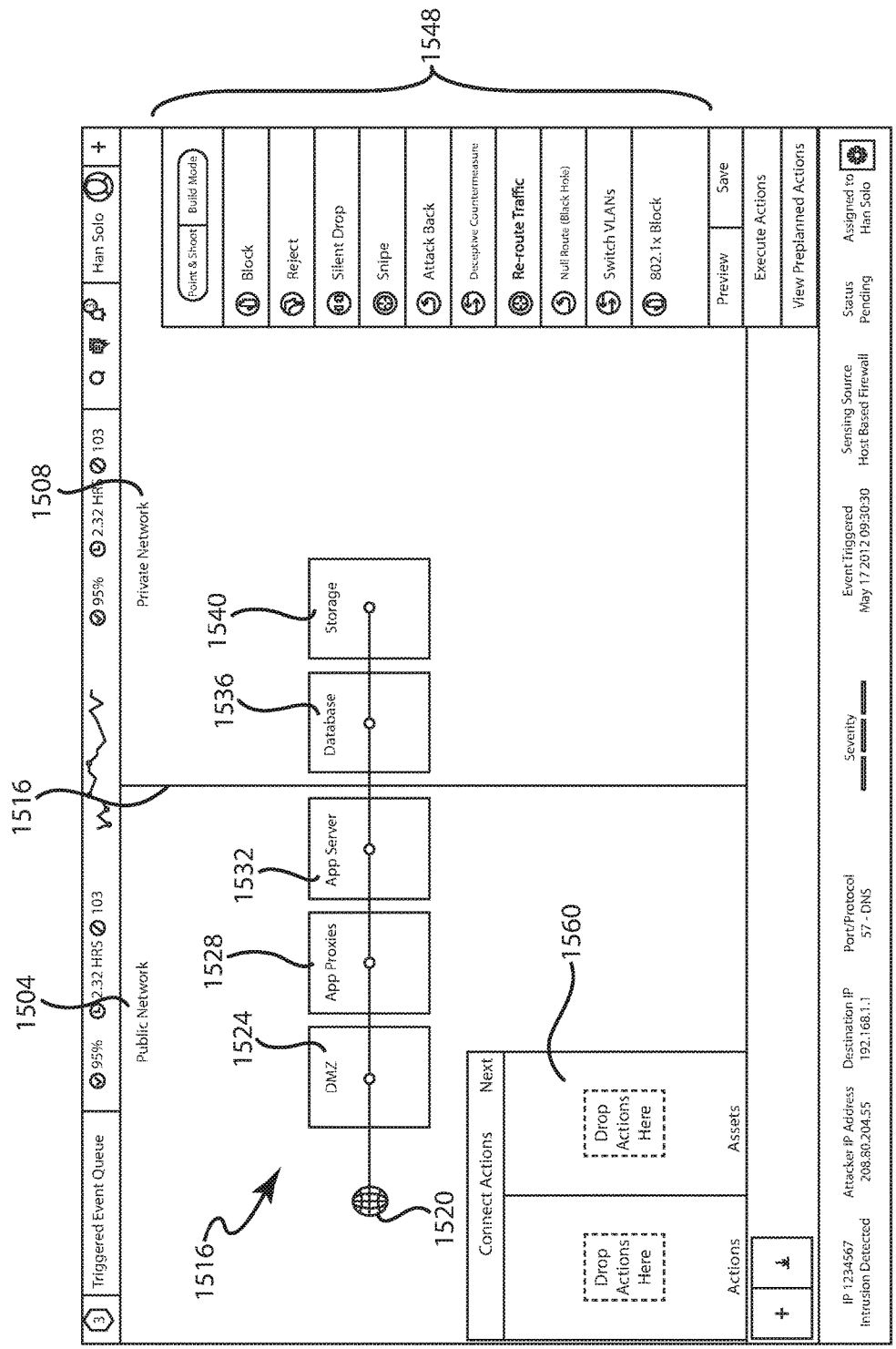

FIGS. 15B-E shows a network security map 1500 that include a network diagram 1516. The network diagram 1516 represents the monitored network 700 broken out by elements that can be controlled in responding to a security threat. More specifically, the monitored network 700 is broken out by elements or zones that can be coordinated or controlled by the activation component 116 or other components discussed herein. Thus, the example network map 1516 includes a DMZ 1524, application proxies 1528, an application server 1532, a database 1536, and storage 1540. The network map 1516 also shows a connection to the Internet 1520. The network map 1500 may also show a dividing line 1512 between the public network 1504 and the private network 1508. The map 1500 may also contain a menu 1544 having a number of drag and drop items 1548 that represent network security actions. The drag and drop items 1548 may be selected and moved to be correlated with particular network elements so as to initiate certain pre-planned actions. As shown in FIG. 15C, the map includes a correlation area 1560 adapted to facilitate drag and drop functionality. Specifically, a user may correlate an action with a network security element by dragging and dropping an action item 1548 and a network element icon 1524, 1528 to the correlation area 1560. This drag and drop action may cause the corresponding action to be applied to the network security element.

In accordance with embodiments discussed herein, one or more of the network elements may be selected so that it is broken out into sub-elements. In FIG. 7E, the DMZ 1524 is broken out into sub-elements 1568, 1572. In various embodiments, each of the main security zones on the map represents the functional areas by which the network is being categorized. Function and naming may be different for each environment. When one of those functional areas, like DMZ is selected, it can expand to show which security elements are in front of the network elements that are in that functional grouping. In certain embodiments, the map does not show all the network elements, but rather only the network element functions and types. This reduces the size and complexity of the zone map. Once expanded the security analyst can very quickly see with elements and element types that are in the zone needing protection. Alternatively he/she could select an in-line zone that is in front of the zone needing protection, and act there to protect the downstream zone(s). Once expanded, the visible security elements can be dragged onto correlation area 1560 or other assembly stage, grouped with common-English action names (like "Block"), saved, and executed. These assembled action sets can also be shared with the other security analysts in the company via publishing to the enterprise security community (within the GUI).

Figure 15D:
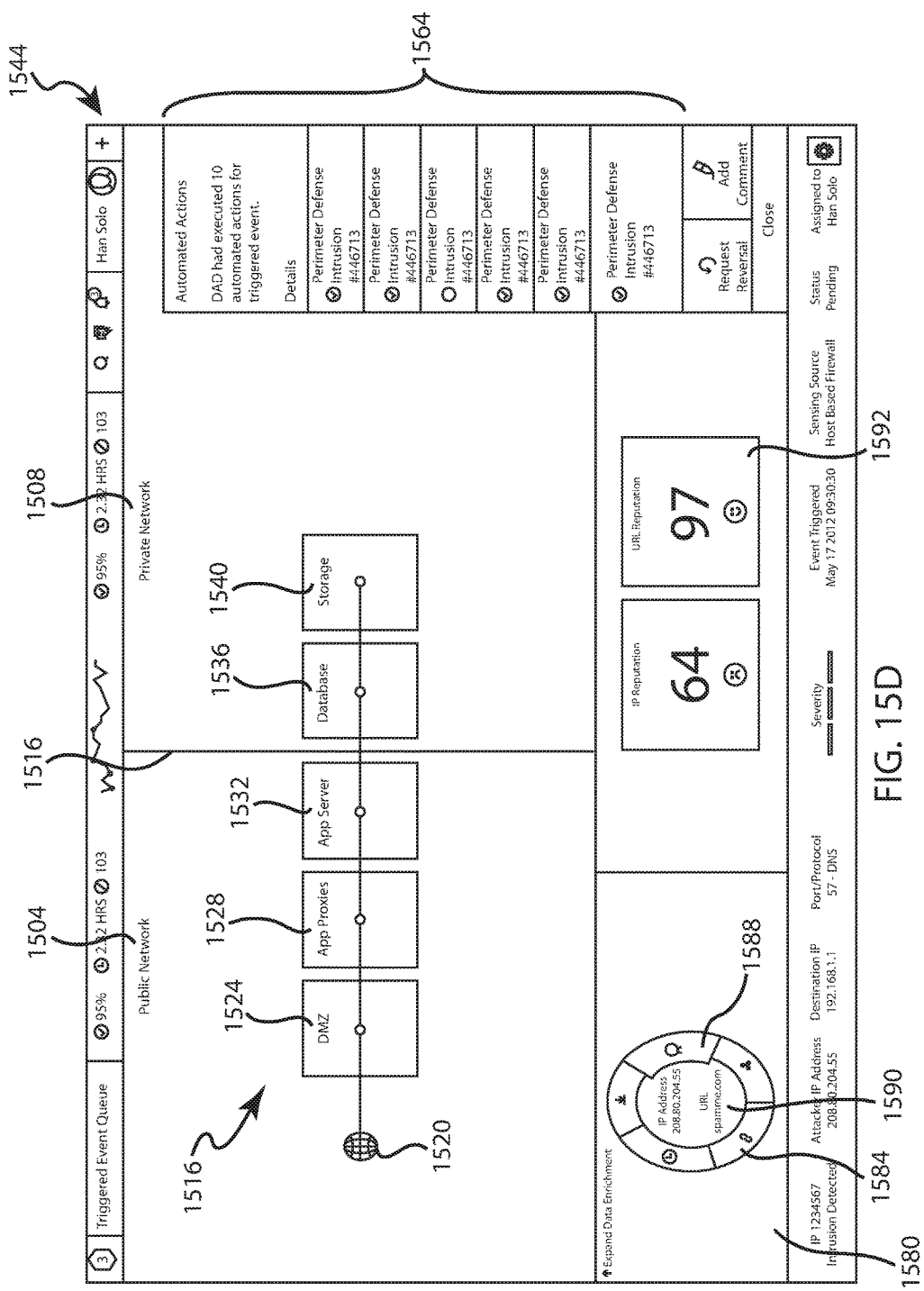
Figure 15E:
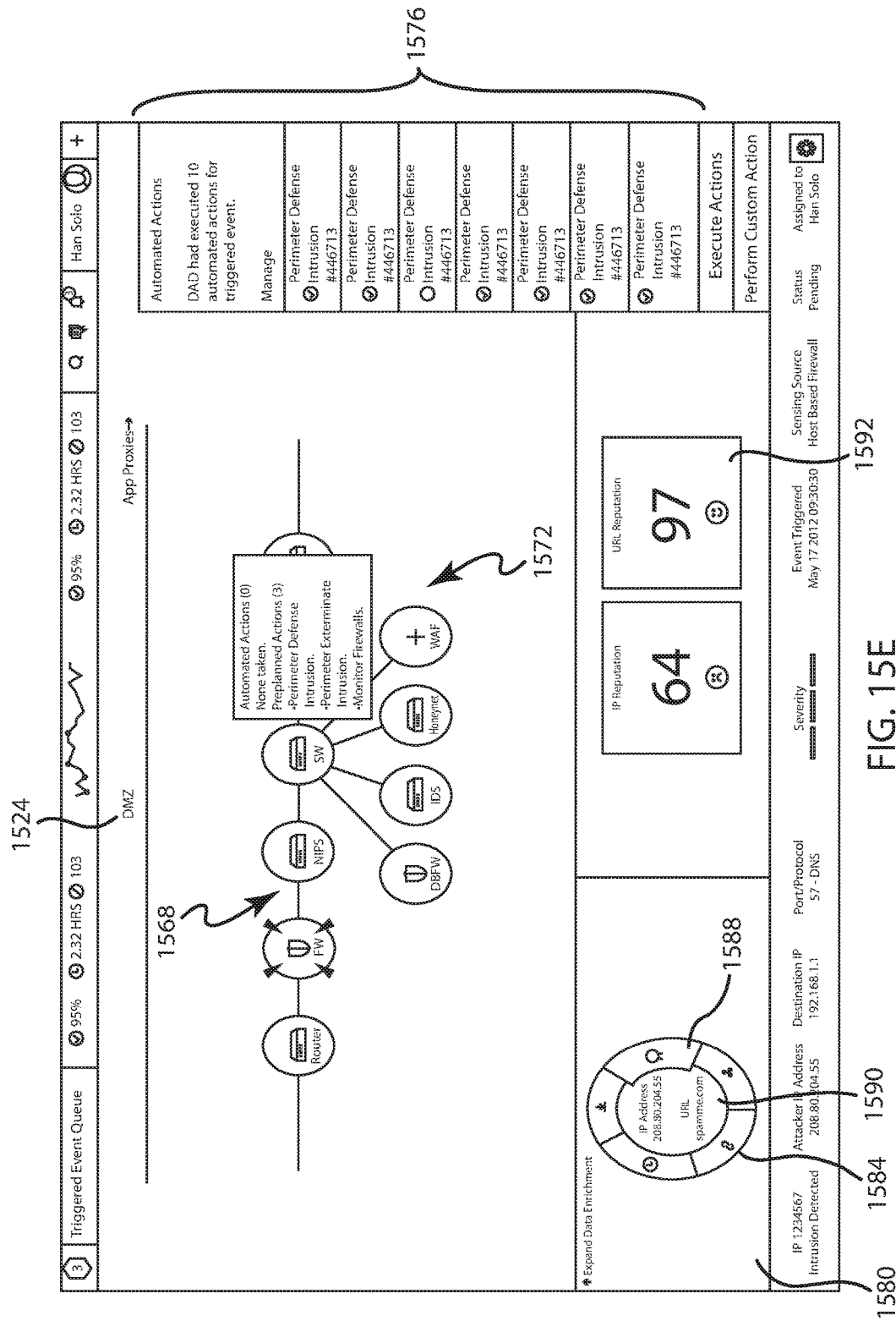

The map 700 may also include a data enrichment GUI 1580. The GUI 1580 may be used to indicate or otherwise provide information as to the source of a cyber-security attack. FIGS. 15D-E are screen shots that include an example GUI 1580 used to deliver an expanded intelligence set, as described in greater detail above. The example GUI 1580 includes an interactive tool 1584 that can be clicked-on or otherwise manipulated by user input. The example GUI 1580 additionally provides output to the user in response to selections or manipulations received through the interactive tool 1584. The interactive tool 1584 may have a number of selectable sections or icons 1588 that can selected for delivery of different information through the GUI 1580. The interactive tool 1584 may also have information display area 1590 that can be used to provide general information about current cyber security threats.

As shown in FIGS. 15D-E, the data enrichment GUI 1580 may display cyber-security threat information that is detected or is being monitored as coming from a particular web address or IP address. Cyber-security personal or other users can then click-on or otherwise select the icons 1588 to receive additional or enhanced information regarding the cyber-security threat. The additional information can be pulled using the activation component from other network and security assets at the security team's disposal. The GUI 1580 may have a number of display panels 1592 that deliver the enhanced data. In this example, the display panel 1592 displays numbers representing ratings or confidence levels for the web address or IP address associated with the attack. The ratings or other information may be derived from data ingest, recursive searching, iterative searching, or other mechanisms or procedures described herein. It should be appreciated that the GUI 1580 shown in FIG. 15D-E is shown by way of example and not limitation. Other GUIs, menus or displays that accomplish the function of delivering enhanced intelligence are within the scope of the invention. The information is also processed by the mediation component, normalized and displayed in a user friendly format instead of using the raw data from the source. Data in enrichment is also normalized for utilization within an action plan.

The menu 1544 may also include pre-planned action display 1576. The pre-planned action display 1576 may include actions or groups of actions that, as part of an approved cyber-security policy, are associated with certain types of cyber-security threats. These action plans are automatically identified by the solution using event criteria routing rules to properly categorize the event, and determine the proper course of action. Both the event identification, and corresponding routing are part of the solution offering to allow a security professional to create these "pre-planned" actions and courses of remediation. Accordingly, an analyst may have available a GUI from which an entire set of dialogues or cyber-security actions may be initiated.

Countering Ongoing Security Threats

The graphical user interface and other disclosed features allow network security personal to counter on-going network security threats. A cyber-security response in accordance with disclosed embodiments may include automated responses and/or response that are initiated in response to commands from network security personal. In one embodiment, the reporting component 112 may display one or more preplanned network security actions in a graphical user interface, each preplanned network security action being correlated with at least one particular network security element according to an established network security policy. As used herein, "an established network security policy" includes cyber-security actions or responses include cyber-security actions that have been approved responding to a security threat prior to the current security threat 728 occurring. In displaying the one or more preplanned network security actions, the reporting component 112 may group together cyber-security actions and network security elements to which the actions are to be applied.

The reporting component 112 may also display one or more custom network security actions in the graphical user interface. As used herein, the "custom" network security actions may not be specifically correlated with a particular network security element in established network security policy. Thus, the correlation between the network security action and the network security element may be made by network security personal "on-the-fly," or as the cyber-security attack is on-going. In one respect, the activation component 116 may respond to the cyber-security attack by executing preplanned network security actions responsive to user input. In another respect, the activation component 116 may respond to the cyber-security attack by executing custom network security actions where the correlation between and the action and network security element is provided by user input as the attack is on-going. Countering on-going network security threats is discussed in more detail in connection with FIG. 16.

Figure 16:
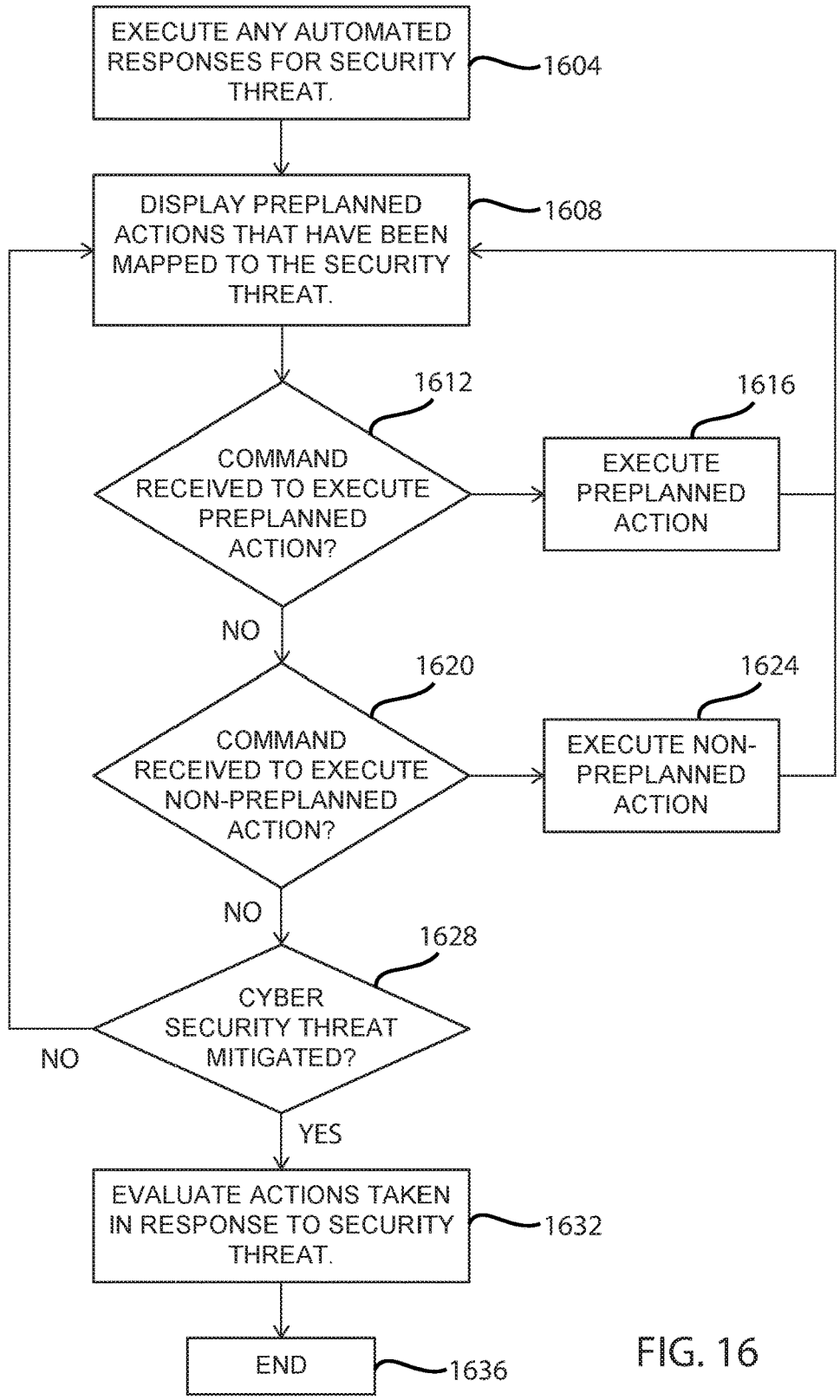
FIG. 16 is a flow chart that illustrates further operations of the cyber-data management node of FIG. 1.

FIG. 16 is a flow chart that illustrates operations of the cyber-data management node 104 in accordance with embodiments discussed herein. Initially, in operation 1604, the cyber-data management node 104 responds to the security threat by executing any automated responses that are appropriate to the current security threat. In some instances, as shown in FIG. 7, the security alert may indicate an internal attack that originates from inside the enterprise 708, for example, from a desktop 724. In other instances, the security alert may indicate an external attack that originates from outside the enterprise 708, for example, from the Internet 704. Thus, in some instances, an automated response may include blocking network traffic at the perimeter 712. If such an action is taken as an automated response, the action is taken without human intervention. Operation 1608 may be executed following operation 1604.

In operation 1608, the cyber-data management node 104 displays preplanned actions that have been mapped to the current security threat. The preplanned actions may be those actions or groups of actions that security personal have been approved to take in response to certain cyber-security threats, and not performed automatically. Operation 1608 may include operations of the mediation module 108 that displays the preplanned action in a graphical user interface (GUI), interactive menu, or the like. Operation 1612 may be executed following operation 1608.

In operation 1612, the cyber-data management node 104 determines if a command has been received to execute a particular preplanned action. If such a command is received, the preplanned action may be executed in operation 1616. Following execution of the preplanned action in operation 1616, operation 1608 may again be executed such that the cyber-data management node 104 again displays preplanned actions that have been mapped to the current security threat. If, in operation 1612, no command is received to execute a particular preplanned action, operation 1620 may then be executed.

In operation 1620, the security personal may determine that a particular action is an appropriate response to the current security threat. The action decided upon by security personal may, in some instances, not be among those actions that were designed in the group of preplanned actions, i.e. an ad-hoc decision or custom action may be taken using the available actions within the cyber security tool's repository of actions. The security personal may decide upon the custom action based on an examination of enriched security threat data provided by the mediation module 108. If such a command to execute a custom action is received, the action may be executed in operation 1624.

The custom actions may be executed by security personnel, using a user interface within the cyber security tool. The user interface may present some or all available actions the tool is capable of executing, and the devices which correlate to those actions. For example, the tool can "Block IP Address", and can do so on a Firewall or Proxy that is connected to the cyber security tool. Other examples include "Create Ticket", which can be done on Ticketing and GRC systems, or "Pull Packet Capture" and presents security devices such as Network Forensics and Network Monitoring tools to the user so that he may retrieve the enrichment information to review it and make a more informed decision when taking the next step. The pairing of security assets to pertinent actions is done using defined cyber taxonomy. The user interface for custom actions allow the user to respond to events for which there is no pre-planned or automated action plan defined.

In operation 1628, the security personnel may determine if the current cyber threat has been mitigated. If the current cyber threat has not been mitigated, operation 1608 may again be executed such that the cyber-data management node 104 again displays preplanned actions that have been mapped to the current security threat. The security personnel may also execute operation 1628, the custom action to take further remediation steps to eradicate the threat. If the current cyber threat has been mitigated, operation 1632 may be executed following operation 1628.

In operation 1632, the cyber-data management node 104 evaluates the actions taken in response to the received security threat. Here, the cyber-data management node 104 may store one or more successful actions for later use in counter a similar cyber security threat. More specifically, custom actions taken may be stored as a pre-planned action for later use in a consistent, recommended delivery. Following operation 1632, the method may end in operation 1635.

Layered Security

In accordance with various embodiments, the cyber-data management node 104 implements a layered security model. In connection with a layered security model, the reporting component 112 displays one or more network security actions in a graphical user interface responsive to a cyber-security alert for a cyber-security attack received by the reporting component 112. The activation component 116 then responds to the cyber-security attack including executing one or more network security actions selected by a user through the graphical user interface. The cyber-data management node 104 repeats the operations of displaying and responding until the cyber-attack is mitigated. Following this, the cyber-data management node 104 stores one or more network security actions that contributed to mitigating the cyber-attack as part of the network security policy so as to be automatically applied without specific user input in response to a subsequent cyber-attack. The layered security model is discussed in more detail in connection with FIG. 17.

Figure 17:
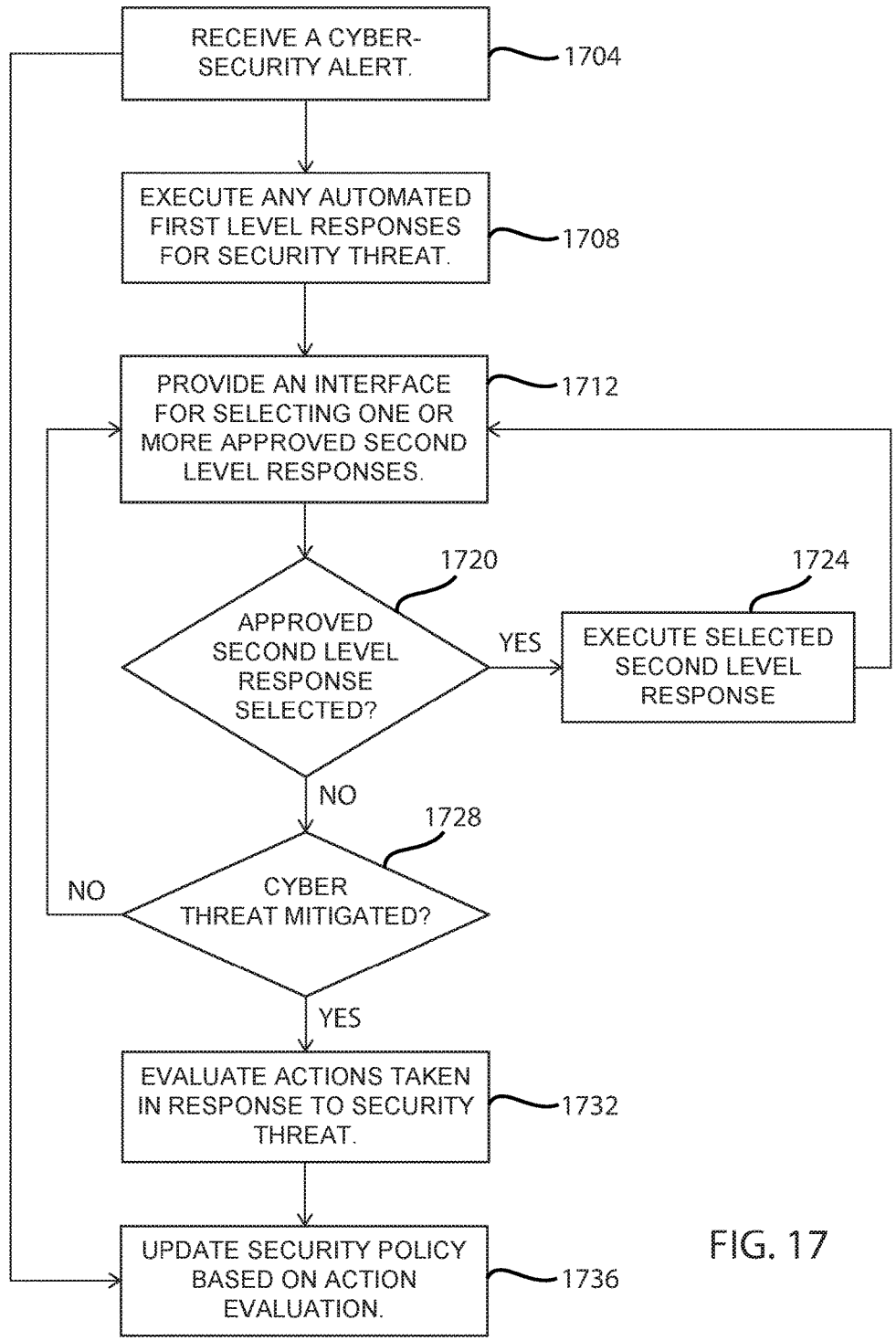
FIG. 17 is a flow chart that illustrates further operations of the cyber-data management node of FIG. 1.

FIG. 17 is a flow chart that illustrates operations of the cyber-data management node 104 in accordance with embodiments discussed herein. A flow chart of operations for a layered security model is illustrated in FIG. 17 in accordance with embodiments discussed herein. Initially, in operation 1704, the cyber-data management node 104 receives a cyber-security alert. In some instances, as shown in FIG. 7, the security alert may indicate an internal attack that originates from inside the enterprise 708, for example, from a desktop 724. In other instances, the security alert may indicate an external attack that originates from outside the enterprise 708, for example, from the Internet 704. Operation 1708 may be executed following operation 1704.

In operation 1708, the cyber-data management node 104 responds to the cyber-security alert with any appropriate automated first level responses. An automated first level response is one that, as part of an established security policy, is taken without specific human intervention. In some instances, such as the external attack illustrated in FIG. 7, an automated response may include blocking network traffic at the perimeter 712. The automated actions taken without specific human intervention in operation 1708 are typically those actions that are known to be reliably effective in responding to particular cyber-security threats or that have proven to be effective overtime. Operation 1712 may be executed following operation 1708.

In operation 1712, the cyber-data management node 104 provides an interface for selecting one or more approved second level responses. Here, the cyber-data management node 104 may display one or more approved second level responses as preplanned actions that have been mapped to the current security threat. The preplanned actions may be those actions or groups of actions that security personal have been approved to take in response to certain cyber-security threats. Operation 1712 may include operations of the mediation module 108 that displays the second level responses in a graphical user interface (GUI), interactive menu, or the like. Operation 1716 may be executed following operation 1712.

In operation 1716, the cyber-data management node 104 determines if an approved second level response has been selected. If so, the selected response may be executed in operation 1720. Following execution of the selected response in operation 1720, operation 1712 may again be executed such that the cyber-data management node 104 again provides an interface for selecting one or more approved second level responses. If, in operation 1716, no approved second level response has been selected, operation 1724 may then be executed.

In operation 1724, the cyber-data management node 104 determines if the cyber threat has been mitigated. If the cyber threat has not been mitigated, operation 1712 may again be executed such that the cyber-data management node 104 again provides an interface for selecting one or more approved second level responses. If the current cyber threat has been mitigated, operation 1728 may be executed following operation 1724.

In operation 1728, the cyber-data management node 104 evaluates the actions taken in response to the received security threat. Here, the cyber-data management node 104 may evaluate groups of second level responses taken to determine if those responses should be included as first level responses. Operation 1732 may be executed following operation 1728.

In operation 1732, the security policy may be updated based on the determinations made in operation 1728. Following operation 1732, operation 704 may again be executed such that the cyber-data management node 104 receives and processes the next cyber security threat.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the invention. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A method of responding to a cyber-security attack, comprising:
    receiving a cyber-security alert for a cyber-security attack at a cyber-data management node, the cyber-data management node operating on a server associated with a network;
    analyzing the received cyber-security alert by a mediation component of the cyber-data management node to determine, from a plurality of cyber-security responses and based on a network security policy, a cyber-security response including information of at least one countermeasure and information of at least one network security element operatively coupled to the cyber-data management node;
    displaying a plurality of icons by a reporting component of the cyber-data management node including a countermeasure icon for the at least one countermeasure and a network security element icon for the at least one network security element, the countermeasure icon and the network security element icon having an association that is graphically represented within a graphical user interface in response to a user input selecting at least one of the countermeasure icon or the network security element icon, the countermeasure icon and the network security element icon lacking the association prior to receiving the user input; and
    sending a signal to respond, in response to the user input, to the cyber-security attack by applying the at least one countermeasure to the at least one network security element.

2. The method of claim 1, further comprising:
    receiving the user input selecting the countermeasure icon; and
    responding to the cyber-security attack by applying the at least one countermeasure to the at least one network security element responsive to the user input.

3. The method of claim 1, further comprising:
    receiving the user input selecting the network security element icon; and
    responding to the cyber-security attack by applying the at least one countermeasure to the at least one network security element responsive to the user input.

4. The method of claim 1, wherein:
    the cyber-security response includes a plurality of countermeasures including the at least one countermeasure; and
    the plurality of icons includes a plurality of countermeasure icons including the countermeasure icon, each one of the plurality of countermeasure icons corresponding to one of the plurality of countermeasures.

5. The method of claim 4, further comprising:
    receiving the user input selecting the countermeasure icon from the plurality of countermeasure icons, the countermeasure icon and the network security element icon having the association that is graphically represented within the graphical user interface in response to the user input.

6. The method of claim 4, wherein:
    the association is a first association;
    the method further includes:
    receiving the user input selecting the network security element icon, the plurality of countermeasure icons and the network security element icon having a second association that is graphically represented within the graphical user interface in response to the user input; and
    responding to the cyber-security attack by applying, to the at least one network security element responsive to the user input, the plurality of the countermeasures corresponding to the plurality of the countermeasure icons that have the association with the network security element icon.

7. The method of claim 1, wherein:
    the cyber-security response includes a plurality of groups of countermeasures and a plurality of network security elements; and
    the plurality of icons includes a plurality of groups of countermeasure icons and a plurality of network security element icons, each one of the plurality of groups of countermeasure icons corresponding to one of the plurality of groups of countermeasures, each one of the plurality of network security element icons corresponding to one of the plurality of network security elements.

8. The method of claim 7, wherein:
    the association is a first association;
    the method further includes:
    receiving the user input selecting the at least one network security element icon from the plurality of network security element icons, the plurality of groups of countermeasure icons and the network security element icon having a second association that is graphically represented within the graphical user interface in response to the user input; and
    responding to the cyber-security attack by applying, to the at least one network security element corresponding to the network security element icon selected in response to the user input, the plurality of groups of countermeasures corresponding to the plurality of groups of countermeasure icons.

9. The method of claim 7, wherein the plurality of network security element icons are arranged in a sequential order in the graphical user interface, the sequential order corresponding to an order in which the plurality of groups of countermeasure are to be applied in the response.

10. The method of claim 1, wherein the at least one network security element is a network element that can be acted on by an activating and provisioning system associated with the cyber-data management node.

11. A system for responding to a cyber-security attack, comprising:
at least one processor;
at least one memory operably linked to the at least one processor, the at least one memory including instructions, which when executed on the at least one processor, cause the processor to
display a plurality of network security element icons in a network security map;
display a plurality of cyber-security countermeasure icons in the network security map;
receive a user input that correlates at least one network security element icon from the plurality of the network security elements icons with at least one cyber-security countermeasure icon from the plurality of the cyber-security countermeasure icons, the at least one network security element icon lacking correlations in the network security map with the at least one cyber-security countermeasure icon prior to receiving the user input; and
send a signal to apply a cyber-security countermeasure to a network security element responsive to the user input, the cyber-security countermeasure corresponding to the at least one cyber-security countermeasure icon, the network security element corresponding to the at least one network security element icon.

12. The system of claim 11, wherein the at least one memory comprises further instructions, which when executed on the at least one processor, cause the processor to:
display an icon correlation area in the network security map;
the operation of receiving the user input includes receiving the user input that drags and drops the at least one network security element icon to the icon correlation area, and receiving the user input that drags and drops the at least one cyber-security countermeasure icon to the icon correlation area.

13. The method of claim 11, wherein:
the receiving the user input includes receiving the user input that selects the at least one network security element icon displayed in the network security map;
the at least one memory includes further instructions, which when executed on the at least one processor, cause the processor to expand the at least one network security element icon responsive to the user input to display a plurality of sub-element icons each associated with the at least one network security element icon.

14. The method of claim 13, wherein:
the user input is a first user input;
the at least one cyber-security countermeasure icon is a first cyber-security countermeasure icon;
the cyber-security countermeasure is a first cyber-security countermeasure;
the at least one memory includes further instructions, which when executed on the at least one processor, cause the processor to:
receive a second user input that correlates at least one of the plurality of sub-element icons with a second cyber-security countermeasure icon from the plurality of the cyber-security countermeasure icons; and
apply a second cyber-security countermeasure to a network security sub-element responsive to the second user input, the second cyber-security counter measure corresponding to the second cyber-security countermeasure icon, the network security sub-element corresponding to the at least one of the plurality of sub-element icons.

15. The method of claim 11, wherein the at least one memory comprises further instructions, which when executed on the at least one processor, cause the processor to:
receive a cyber-security alert for the cyber-security attack;
analyze the cyber-security alert to at least identify a source of the cyber-security attack; and
display an indication of the source of the cyber-security attack on the network security map.

16. The method of claim 15, wherein the at least one memory comprises further instructions, which when executed on the at least one processor, cause the processor to:
compile information regarding the received cyber-security alert;
analyze the complied information and continue to compile information regarding the received cyber-security alert until a threshold amount of information regarding the cyber-security attack is obtained; and
output an expanded data set for the cyber-security attack including at least a portion of the complied information in combination with the network security map.

17. A system for responding to a cyber-security attack, comprising:
means for displaying a plurality of network security element icons in a network security map;
means for displaying a plurality of cyber-security countermeasure icons in the network security map;
means for receiving a user input that correlates at least one network security element icon from the plurality of the network security elements icons with at least one cyber-security countermeasure icon from the plurality of the cyber-security countermeasure icons, the at least one network security element icon lacking correlations in the network security map with the at least one cyber-security countermeasure icon prior to receiving the user input; and
means for sending a signal to apply a cyber-security countermeasure to a network security element responsive to the user input, the cyber-security countermeasure corresponding to the at least one cyber-security countermeasure icon, the network security element corresponding to the at least one network security element icon.

18. A non-transitory processor-readable medium storing code representing instructions to be executed by a processor, the code comprising code to cause the processor to:
receive a cyber-security alert for a cyber-security attack at a cyber-data management node, the cyber-data management node operating on a server associated with a network;
analyze the received cyber-security alert to determine, from a plurality of cyber-security responses and based on a network security policy, a cyber-security response including information of at least one countermeasure and information of at least one network security element operatively coupled to the cyber-data management node;

send a first signal to cause display of a plurality of icons including a countermeasure icon for the at least one countermeasure and a network security element icon for the at least one network security element, the countermeasure icon and the network security element icon having a correlation that is graphically represented in a graphical user interface in response to a user input selecting at least one of the countermeasure icon or the network security element icon, the countermeasure icon and the network security element icon lacking the correlation prior to receiving the user input; and send a second signal to respond, in response to the user input, to the cyber-security attack by applying the at least one countermeasure to the at least one network security element.

19. The method of claim 1, wherein the association of the countermeasure icon and the network security element icon is a correlation that is graphically represented within the graphical user interface.

20. The method of claim 1, wherein:
the cyber-security response includes a plurality of countermeasures and a plurality of network security elements;
the plurality of icons includes a plurality of countermeasure icons and a plurality of network security element icons, each countermeasure icon from the plurality of countermeasure icons uniquely associated with a countermeasure from the plurality of countermeasures, each network security element icon from the plurality of network security element icons associated with a network security element from the plurality of network security elements;
the method further includes:
receiving the user input selecting (1) a set of countermeasure icons from the plurality of countermeasure icons and (2) a set of network security element icons from the plurality of network security element icons, the set of countermeasure icons and the set of network security element icons having at least one association that is graphically represented within the graphical user interface in response to the user input; and
responding to the cyber-security attack by applying, to a set of network security elements associated with the set of network security element icons selected by the user input and from the plurality of network security elements, a set of countermeasures associated with the set of countermeasure icons selected by the user input and from the plurality of countermeasures.

21. The method of claim 1, wherein:
the countermeasure icon is independent of the at least one network security element, and
the network security element icon is independent of the at least one countermeasure.

* * * * *